US008431022B2

(12) United States Patent
Ward

(10) Patent No.: US 8,431,022 B2
(45) Date of Patent: Apr. 30, 2013

(54) MODULAR DUAL VESSEL DISSOLVED AERATION FLOTATION TREATMENT SYSTEM

(76) Inventor: Stuart Johnathan Ward, Camas, WA (US)

( * ) Notice: Subject to any disclaimer, the term of this patent is extended or adjusted under 35 U.S.C. 154(b) by 129 days.

(21) Appl. No.: 13/160,459

(22) Filed: Jun. 14, 2011

(65) Prior Publication Data

US 2012/0006732 A1 Jan. 12, 2012

Related U.S. Application Data

(63) Continuation-in-part of application No. 12/856,053, filed on Aug. 13, 2010, now abandoned, and a continuation-in-part of application No. 12/683,340, filed on Jan. 6, 2010, now abandoned.

(51) Int. Cl.

| | |
|---|---|
| ***C02F 1/24*** | (2006.01) |
| ***C02F 1/52*** | (2006.01) |
| ***C02F 9/02*** | (2006.01) |

(52) U.S. Cl.

USPC ........ 210/221.2; 210/200; 210/201; 210/205; 210/206; 210/322

(58) Field of Classification Search ............... 210/221.2, 210/200, 201, 205, 206, 322

See application file for complete search history.

(56) References Cited

U.S. PATENT DOCUMENTS

| | | | | |
|---|---|---|---|---|
| 4,067,813 | A * | 1/1978 | Pielkenrood | 210/322 |
| 4,193,869 | A * | 3/1980 | Brucker et al. | 210/705 |
| 5,520,806 | A * | 5/1996 | Menke | 210/221.2 |

* cited by examiner

*Primary Examiner* — Thomas M Lithgow

(74) *Attorney, Agent, or Firm* — Mark E. Beatty; Kurt M. Rylander; Rylander & Assoc. PC

(57) ABSTRACT

A modular dual vessel DAF includes a frame, adjacent treatment sections mounted to the frame and including a multi-stage flocculator, aeration injector and mix chamber, stilling well, separation tank, effluent weir having an enclosed peaked upper portion and bottom inlet, clear well with height adjustable risers, surface skimmer, inclined sludge plate, and a sludge collection section, wherein the treatment sections may operate independently, in parallel, or in series. A modular dual vessel DAF may include a separator plate pack in each separation tank.

20 Claims, 27 Drawing Sheets

MODULAR DUAL VESSEL DISSOLVED AERATION FLOTATION TREATMENT SYSTEM

CROSS-REFERENCE TO RELATED APPLICATION

This application is a continuation-in-part of and claims priority to co-pending U.S. Nonprovisional application Ser. No. 12/856,053, filed Aug. 13, 2010, and co-pending U.S. Nonprovisional application Ser. No. 12/683,340, filed Jan. 6, 2010, the disclosures of each of which is hereby incorporated by reference.

FIELD OF THE INVENTION

The present invention relates to liquid treatment systems using flocculate agents and dissolved aeration flotation to clarify liquid streams contaminated with particulates, and especially wastewater containing organic wastes, for example from food processing plants.

BACKGROUND

Clarification relates to reducing solids content in water or other liquid streams which cannot be efficiently removed by mechanical filtration methods. Often a clarification process is used to remove non-dissolved solids before further waste processing, or may be applied to provide water which is clean enough to recycle into the same process even if not clean enough for discharge. Dissolved aeration flotation (DAF) is a widely used method to remove organic contaminants from wastewater streams such as from food processing plants. The basic process consists of injecting water saturated with gas—either air or another gas selected to be less reactive with a particular waste chemistry—into a flotation tank ("aeration"), where the gas comes out of solution forming bubbles which float to the surface of the tank. The aerated water is created by dissolving gas into the water in a high pressure environment until it reaches saturation level at that high pressure. When the gas-saturated water at high pressure is depressurized the gas comes out of solution. Bubble size and density can be controlled by varying, among other things, the maximum saturation pressure and the rate of depressurization. The rising gas bubbles adhere to particulates in the wastewater and lift them to the surface where they are skimmed off. The floating particulate matter is referred to as "retentate", and after removal is referred to as "sludge". Aeration may be accomplished using pressurized saturation tanks or pumps designed for the purpose, such as aeration turbine pumps.

Flocculate agents may be mixed with the wastewater prior to aeration to react with or bind to particulates, creating larger and less dense suspended coagulated particles which are more susceptible to binding with gas bubbles and thereby more effectively driven to the surface for removal. Many flocculating chemicals are known and selected based on the anticipated chemistry of the waste stream and the expected downstream uses of the clarified effluent and retentate sludge. Examples of known coagulants and/or flocculants include cationic polymers, phosphoric acid, lime and anionic polymers. The effectiveness of the system—i.e. the amount of waste removed from the wastewater stream—depends on the size and density of the gas bubbles and the amount of time the wastewater is exposed to the gas bubbles, sometimes referred to as "dwell time". Retaining wastewater in the flotation tank exposed to aerated water for a longer period provides greater removal effectiveness. Longer dwell times are achieved by increasing the size of the tank relative to the anticipated peak flow. However, when the wastewater stream is low, such as when a plant with multiple production lines is running only a few lines, the larger DAF system will operate at low efficiency.

A persistent problem encountered with DAF systems is that they are not efficient when run at low capacity. A system designed to handle a large peak flow requires a large flotation tank volume in order an optimum dwell time, with a consequently large foot print, large pump capacities, and high expense. In order to run efficiently a low production volumes an intermediate collection system is required to accumulate wastewater and run batches through the DAF system at optimum flow rates. Intermediate collection systems consume valuable production area, cost money to build and install, and add maintenance costs.

Greater treatment capacity requires a longer and higher volume separation tank. However, this imposes minimum flow requirements on the system as a whole because the turbine pump/air injection system requires a minimum flow of either recycled clear water or clean freshwater (but adding fresh water increases the overall volume of processed liquid and essentially defeats much of the purpose of the system, which is to reduce fresh water usage and reduce waste stream volumes). Use of side-by-side systems on the same skid permits ½ to be shut down during low volume waste flow periods, such as when part of the production lines have been shutdown, but still retains full capacity during peak times. The system shares components and provides a compact, energy efficient footprint as well. The system may receive wastewater flows from a single source and split them, or may receive flows from separate sources but utilize certain common components, and still be available for a peak flow from a single source.

Additional problems arise with conventional effluent weir designs, which generally comprise a round pipe with perforations distributed along its surface, including the top surface. This design allows particulates to enter the weir pipe and foul the pipe, reducing flow and potentially contaminating the effluent discharge. This design also creates a problem of sediments accumulating on the upper surface of the weir pipe, which periodically dislodge and create spikes of particulates in the effluent. Maintenance requirements are substantially increased due to more frequent flushing required and more difficult cleaning during shutdowns.

Thus, there is a need for DAF treatment system that: (1) is compact; (2) modular to permit scaled or split operations; (3) provides improved methods for removing effluent; (4) reduces buildup of sediments on surfaces; (5) provides improved solids removal efficiency; (6) maximizes removal of effluent from sludge; (7) improves laminar flow within the separation vessel; (8) reduces water velocity within the separation vessel; (9) improves dwell time within the separation vessel; (10) provides for adjustable height risers to control system liquid level; and, (11) improves overall efficiency and cost effectiveness.

SUMMARY AND ADVANTAGES

A modular dual vessel dissolved aeration flotation treatment system includes a frame; first and second treatment sections mounted to the frame adjacent to each other, a skimmer to remove retentate, and a sludge collection section to collect and transfer sludge waste, wherein, the first treatment section and second treatment section may operate independently of each other. Each treatment section includes a separation tank with the tanks sharing a common inside wall, an inclined sludge plate extending from the interior of the separation tank at a height below the liquid operating level of the system to at least the upper edge of the separation tank second end wall, a flocculator portion to pre-treat the waste water stream and having an aeration mixing chamber and aeration injection port and a chemical injection port, an effluent weir mounted low within the separation tank and having an enclosed top portion and a bottom inlet, a clear well including a clear well discharge, a clear well riser in fluid communication with the effluent weir to an adjustable height discharge to set the operating level of the system, and, an aeration injector having an inlet in fluid communication with the clear well and a discharge in fluid communication with the flocculator aeration injection port.

A modular dual vessel DAF may include wherein the angle of each of the sludge plates of the first and second separation tanks is angled within the range 30° to 50° pitch.

A modular dual vessel DAF may include a separator plate pack in each separation tank.

A modular dual vessel DAF may include a stilling well to receive and distribute pre-treated water from the flocculator portion.

A modular dual vessel DAF may include a multi-stage flocculator portion.

A modular dual vessel DAF may include a multi-stage flocculator portion wherein each stage includes a horizontal pipe portion with each stage oriented 180° from the preceding stage.

A modular dual vessel DAF may include an effluent weir having an enclosed peaked top portion and open bottom inlet. The effluent weir may include a square diamond shape cross section. The effluent weir may include a cross section which extends beyond the corresponding clear well riser cross section.

A modular dual vessel DAF may include a plurality of effluent weirs in fluid communication with a plurality of corresponding clear well risers, each of which risers may be height adjustable.

A modular dual vessel DAF may include wherein the height adjustable clear well risers include an adjustable discharge member which slides over the open end of a riser and seal members, and including a locking member to selectively lock it at a desired discharge height.

A modular dual vessel DAF may include wherein the aeration injector is an aeration turbine pump which may draw suction from the clear well to recycle effluent.

A modular dual vessel DAF may include wherein the skimmer includes a plurality of paddles coupled to a cyclical drive mounted to the separation tanks, the paddles including a flexible wiper portion to engage the sludge plate.

A modular dual vessel DAF may include a sludge hopper coupled to a sludge pump and abutting the end walls of the separation tanks and disposed under an overhanging sludge plate.

The present invention provides many advantages over existing systems: (1) it is compact; (2) modular to permit scaled or split operations; (3) provides improved methods for removing effluent; (4) reduces buildup of sediments on surfaces; (5) provides improved solids removal efficiency; (6) maximizes removal of effluent from sludge; (7) improves laminar flow within the separation vessel; (8) reduces water velocity within the separation vessel; (9) improves dwell time within the separation vessel; (10) provides for adjustable height risers to control system liquid level; and, (11) improves overall efficiency and cost effectiveness.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

REFERENCE NUMBERS USED IN DRAWINGS

Figure 1:
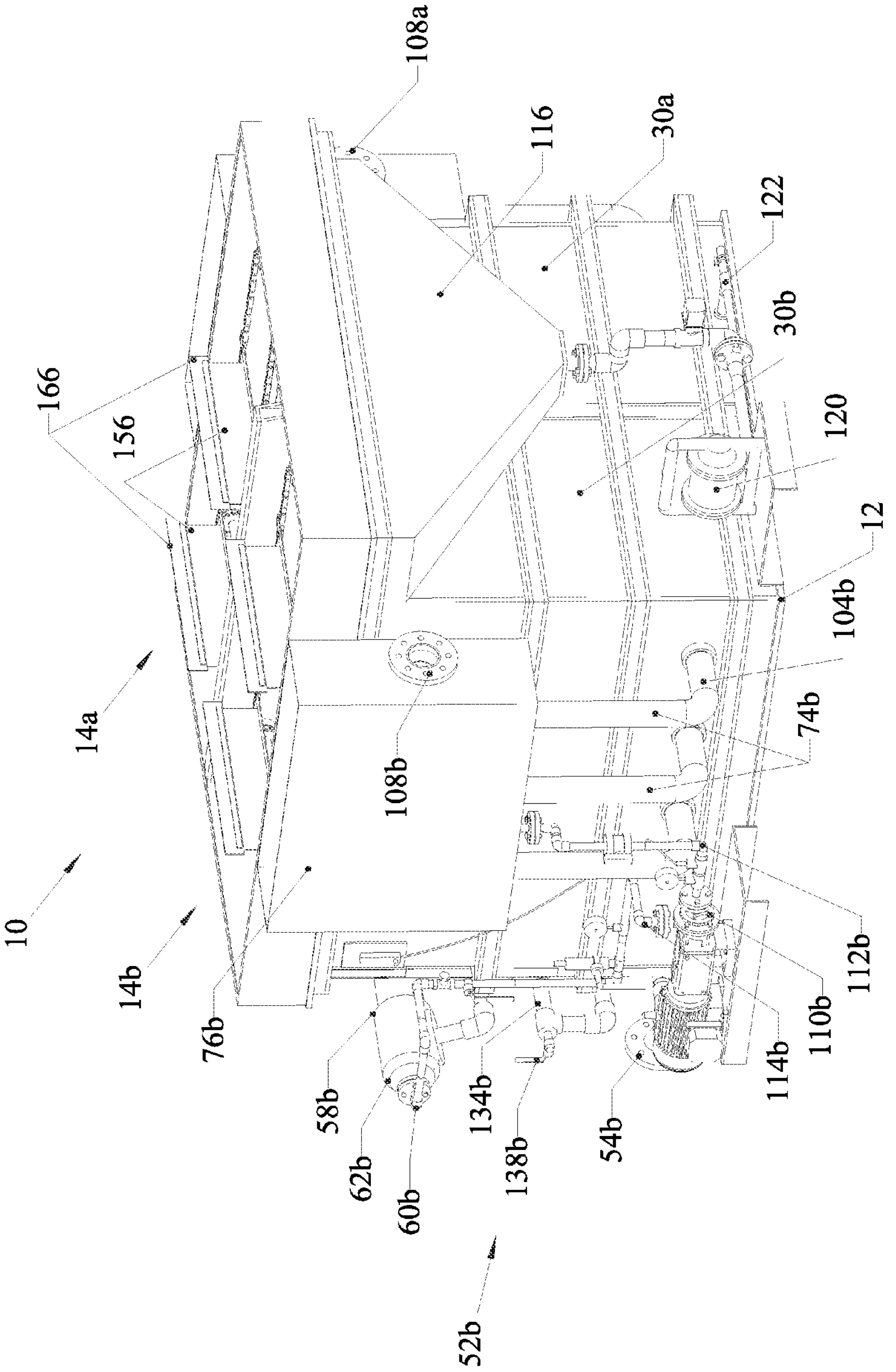
FIG. 1 shows a perspective view of the back end of a first embodiment.

Turning now descriptively to the drawings, in which similar reference characters denote similar elements throughout the several views, the figures illustrate the modular dual vessel dissolved aeration flotation waste water treatment system of the present invention. With regard to the reference numerals used, the following numbering is used throughout the various drawing figures:

10 First embodiment
12 Frame
14*ab* Treatment section
14*ab* Surface skimmer
16 Sludge collection section
20*ab* Separation tank
22*ab* Separation tank bottom wall
24*ab* Separation tank first end wall
26*ab* Separation tank first end wall bottom portion
28*ab* Separation tank first end wall top portion
30*ab* Separation tank second end wall
32*ab* Separation tank second end wall bottom portion
34*ab* Separation tank second end wall top portion
36*ab* Separation tank inside side wall
36 Common separation tank inside side wall
38*ab* Separation tank outside side wall
40*ab* Separation tank inside sidewall bottom portion
42*ab* Separation tank inside sidewall top portion
44*ab* Separation tank outside sidewall bottom portion
46*ab* Separation tank outside sidewall top portion
48*ab* Sludge plate
50*ab* Sludge plate incline angle
52*ab* Flocculator portion
54*ab* Flocculator inlet
56*ab* Flocculator discharge
58*ab* Flocculator aeration mixing chamber
60*ab* Flocculator aeration injection port
62*ab* Flocculator aeration mixing chamber upstream end
64*ab* Flocculator chemical injection port
66*ab* Effluent weir
68*ab* Effluent weir top portion
70*ab* Effluent weir bottom inlet
72*ab* Effluent weir discharge
74*ab* Clear well riser
76*ab* Clear well
78*ab* Clear well bottom wall
80*ab* Clear well side wall
82*ab* Clear well side wall
84*ab* Clear well side wall
86*ab* Clear well side wall
88*ab* Clear well side wall bottom portion
90*ab* Clear well side wall top portion
92*ab* Clear well side wall bottom portion
94*ab* Clear well side wall top portion
96*ab* Clear well side wall bottom portion
98*ab* Clear well side wall top portion
100*ab* Clear well side wall bottom portion
102*ab* Clear well side wall top portion
104*ab* Clear well riser bottom portion
106*ab* Clear well riser discharge
108*ab* Clear well discharge
110*ab* Aeration injector
112*ab* Aeration injector inlet
114*ab* Aeration injector discharge
116 Sludge hopper
118 Sludge hopper end wall
120 Sludge pump
122*ab* Separator plate pack
124*ab* Separator plate
126*ab* Separator plate top edge
132*ab* Flocculator first stage
134*ab* Flocculator second stage
136*ab* Flocculator third stage
138*ab* Flocculator second stage chemical injection port
140*ab* Flocculator third stage chemical injection port
142*ab* Effluent weir apex
144*ab* Effluent weir closed end
146*ab* Effluent weir dead space
148*ab* Aeration turbine pump supply line
150 First cyclical drive mechanism
152 First cyclical drive mechanism first end
154 First cyclical drive mechanism second end
156 Paddle
158 Second cyclical drive mechanism
160 Second cyclical drive mechanism first end
162 Second cyclical drive mechanism second end
164 Paddle rigid coupling flange
166 Paddle flexible wiper
168 Paddle first wing flange
170 Paddle second wing flange
172 Chain
174 Drive sprocket
176 Common drive shaft
178 Idler sprocket
180 Common idler shaft
182 Drive mechanism common drive motor
184*ab* Clear well riser grooves
186*ab* Sealing members
188*ab* Separable riser discharge member
190*ab* Set screw
192*ab* Dimples
194*ab* Clear well riser top end
1010 Second embodiment
1012 Frame
1014*ab* Treatment section
1016 Surface skimmer
1018 Sludge collection section
1020*ab* Separation tank
1022*ab* Separation tank bottom wall
1024*ab* Separation tank first end wall
1026*ab* Separation tank first end wall bottom portion
1028*ab* Separation tank first end wall top portion
1030*ab* Separation tank second end wall
1032*ab* Separation tank second end wall bottom portion
1034*ab* Separation tank second end wall top portion
1036*ab* Separation tank inside side wall
1036 Common separation tank inside side wall
1038*ab* Separation tank outside side wall
1040*ab* Separation tank inside sidewall bottom portion
1042*ab* Separation tank inside sidewall top portion
1044*ab* Separation tank outside sidewall bottom portion
1046*ab* Separation tank outside sidewall top portion
1048*ab* Sludge plate
1050*ab* Sludge plate incline angle
1052*ab* Flocculator portion
1054*ab* Flocculator inlet
1056*ab* Flocculator discharge
1058*ab* Flocculator aeration mixing chamber
1060*ab* Flocculator aeration injection port
1062*ab* Flocculator aeration mixing chamber upstream end
1064*ab* Flocculator chemical injection port
1066*ab* Effluent weir
1074*ab* Clear well riser
1076*ab* Clear well
1104*ab* Clear well riser bottom portion

1106*ab* Clear well riser discharge
1108*ab* Clear well discharge
1110*ab* Aeration injector
1112*ab* Aeration injector inlet
1114*ab* Aeration injector discharge
1116 Sludge hopper
1118 Sludge hopper end wall
1120 Sludge pump
1128*ab* Stilling well
1130*ab* Stilling well drain
1132*ab* Flocculator first stage
1134*ab* Flocculator second stage
1138*ab* Flocculator second stage chemical injection port
1148*ab* Aeration turbine pump supply line
1150 First cyclical drive mechanism
1156 Paddle
1158 Second cyclical drive mechanism
1164 Paddle rigid coupling flange
1166 Paddle flexible wiper
1172 Chain
1174 Drive sprocket
1176 Common drive shaft
1182 Drive mechanism common drive motor
L Operating liquid level

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

For ease of reference, because the first and second treatment sections have duplicate portions, items relating to a first treatment section will be designated with an "a" suffix, and duplicate items relating to a second treatment section will be designated with a "b" suffix. For example, reference to "separation tank 20*ab*" indicates that both treatment sections 14*a* and 14*b* include an identical separation tank 20*a* and 20*b*, respectively.

Referring to FIGS. 1-16, a first embodiment of modular dual vessel dissolved aeration flotation treatment system 10 is shown, including a frame 12; first and second treatment sections 14*a* and 14*b*, respectively, mounted to frame 12 adjacent to each other. Each treatment section includes a separation tank 20*ab*, a sludge plate 48*ab*, a flocculator portion 52*ab*, an effluent weir 66*ab*, a clear well 74*ab*, a clear well riser 76*ab*, an aeration injector 110*ab*, a surface skimmer 16, and a sludge collection section 18. In the first embodiment, separation tank 20*ab* has a volume defined by a bottom wall 22*ab*, opposing first and second end walls 24*ab* and 30*ab*, respectively, each extending from a bottom portion 26*ab* and 32*ab*, respectively, connected to the bottom wall 22*ab* to a top portion 28*ab* and 34*ab*, respectively, and opposing parallel inside and outside side walls 36*ab* and 38*ab*, respectively, each extending from a bottom portion 40*ab* and 44*ab*, respectively, connected to the bottom wall 22*ab* to a top portion 42*ab* and 46*ab*, respectively. In the embodiment, bottom wall 22*ab* may be flat, but may also be slanted downward to facilitate accumulation and removal of sediments. First and second treatment section inside side walls 36*a* and 36*b* form a common inside wall section 36. Sludge plate 48*ab* extends transversely from the inside side wall 36*ab* to the outside side wall 38*ab* and extends longitudinally from the interior of the separation tank 20*ab* at a height below the liquid operating level L of the system 10 to at least the top portion 34*ab* of the separation tank second end wall 30*ab*. Sludge plate 48*ab* is inclined at an angle from horizontal 50*ab*.

Flocculator portion 52*ab* includes an inlet 54*ab* to receive a liquid stream, an outlet 56*ab* to discharge into the separation tank 20*ab*, an aeration mixing chamber 58*ab* disposed between the flocculator inlet 54*ab* and outlet 56*ab*, an aeration injection port 60*ab* proximal to an upstream end 62*ab* of the aeration mixing chamber 58*ab*, and a chemical injection port 64*ab* disposed between the flocculator inlet 54*ab* and the aeration injection port 60*ab*.

In the embodiment, effluent weir 66*ab* is mounted within the separation tank 20*ab* at a depth proximal to the bottom portions 40*ab* and 44*ab* of the inside and outside side walls, respectively, but set off from the bottom wall 22*ab*. Effluent weir 66*ab* is mounted low within separation tank 20*ab* so as to be fully submerged as low as possible to be below the surface region where retentate raised to the surface by gas bubbles accumulates, but still offset from the bottom surface—where non-floating sediment will accumulate—to prevent ingestion of sediment into the clear well. Effluent weir 66*ab* has an enclosed top portion 68*ab* and a bottom inlet 70*ab* to prevent sinking sediments from entering the weir, and a discharge 72*ab* in fluid communication with a clear well riser 74*ab* to direct clarified effluent out of the system 10. Clear well 76*ab* is mounted adjacent to the separation tank 20*ab* to minimize head loss and footprint. Clear well 76*ab* is defined by a bottom wall 78*ab* and enclosing side walls, 80*ab*, 82*ab*, 84*ab* and 86*ab*, respectively, each clear well side wall 80-86 extending from a bottom portion 88*ab*, 92*ab*, 96*ab*, 100*ab*, respectively, connected to the clear well bottom wall 78*ab* to a top portion 90*ab*, 94*ab*, 98*ab*, 102*ab*, respectively, and further includes a clear well discharge 108*ab* to discharge clarified effluent for further treatment or reuse.

Clear well riser 74*ab* extends from a bottom portion 104*ab* in fluid communication with the effluent weir discharge 72*ab* to a riser discharge 106*ab* within the clear well 76*ab*, wherein the height of the riser discharge 106*ab* is lower than clear well side wall top portions 90*ab*, 94*ab*, 98*ab*, 102*ab*, respectively, and defines the liquid operating level L of the system 10.

In the embodiment, a plurality of clear well risers 74*ab* are provided, each coupled to an individual effluent weir 66*ab* and discharging into a single clear well 76*ab*, in order to provide higher volume flow at low water velocity, and to collect flow from throughout the lower portion of separation tank 20*ab*, thereby maintaining even laminar flow.

Aeration injector 110*ab* is provided, having an inlet 112*ab* in fluid communication with the clear well 76*ab* and a discharge 114*ab* in fluid communication with the flocculator aeration injection port 60*ab*.

In the first embodiment, surface skimmer 16 is mounted to the first and second treatment sections 14*ab* over the tops of separation tanks 20*a* and 20*b*. Sludge collection section 18 is adjacent the second end walls 30*ab* of the first and second treatment sections 14*ab* to receive retentate from the surface skimmer 16. In the embodiment, sludge collection section 18 includes a sludge hopper 116 which includes a common hopper end wall 118 abutting both treatment section second end walls 30*a* and 30*b*. Sludge plates 48*a* and 48*b* extend over hopper common end wall 118 to ensure retentate transfers into sludge hopper 116. Sludge collection section 18 includes a sludge pump 120 to transfer collected retentate (aka sludge) for further processing or disposal. In the embodiment sludge pump 120 is an air operated diaphragm pump, but any appropriate pumping system could be used. In the embodiment a separation tank pump down connection 122 is provided with may be selectively aligned to sludge pump 120 so that sludge pump 120 may be used to pump sediment accumulated on separation tank bottom walls 22*ab*.

First treatment section 14*a* and second treatment section 14*b* may operate independently of each other, such that they may be run simultaneously in parallel aligned to a common waste stream, or one section may be operating while the other is idle, or they may be aligned to separate waste streams with different flocculator chemistry and/or aeration injection settings used, different dwell times, and discharging clean effluent from their respective clear wells 74*ab* to different destinations. In addition, first and second treatment sections 14*a* and 14*b* may be aligned in series, such that the effluent discharge 108*ab* of one section's clear well 74*ab* feeds into the inlet 52*ab* of the other section.

Figure 14:
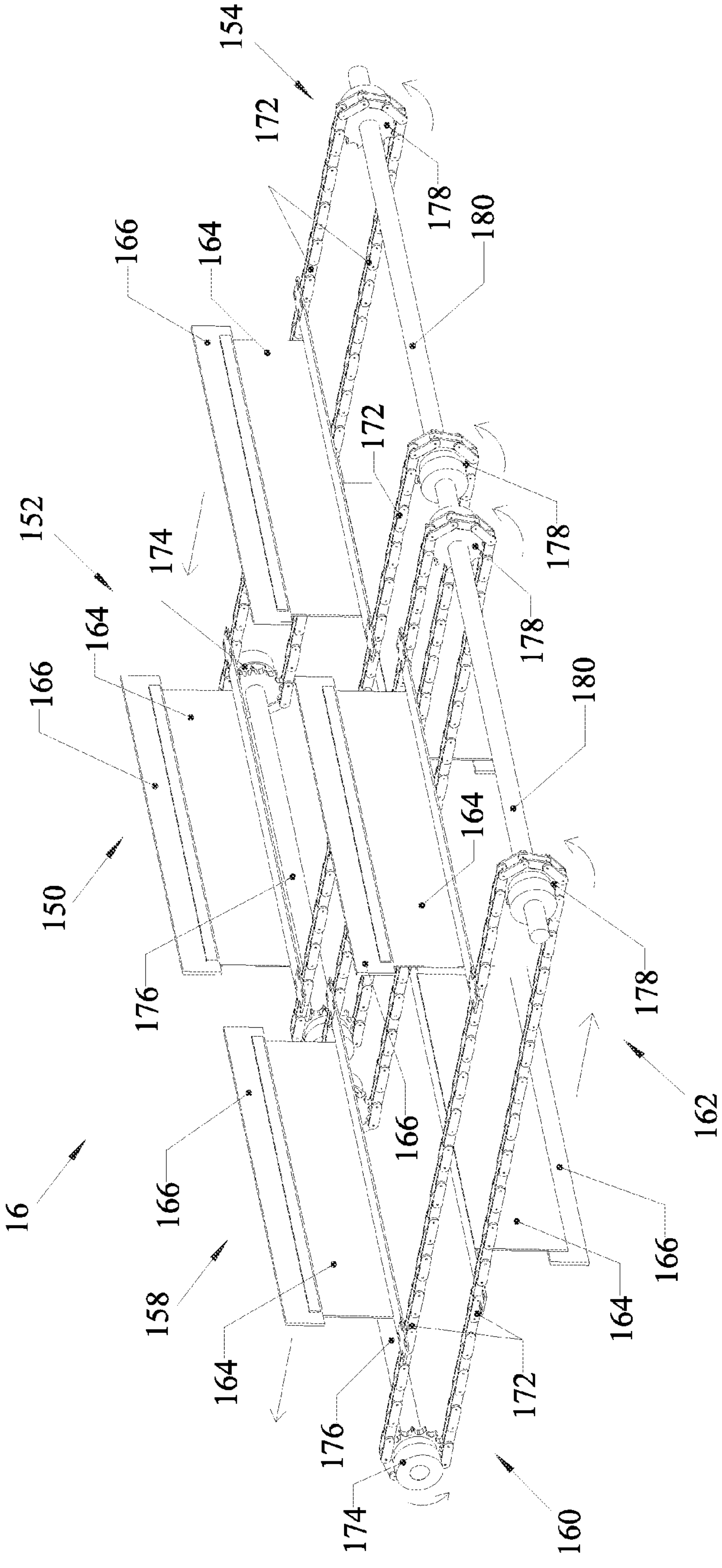
FIG. 14 shows a perspective view of a surface skimmer of a first embodiment.
Figure 15:
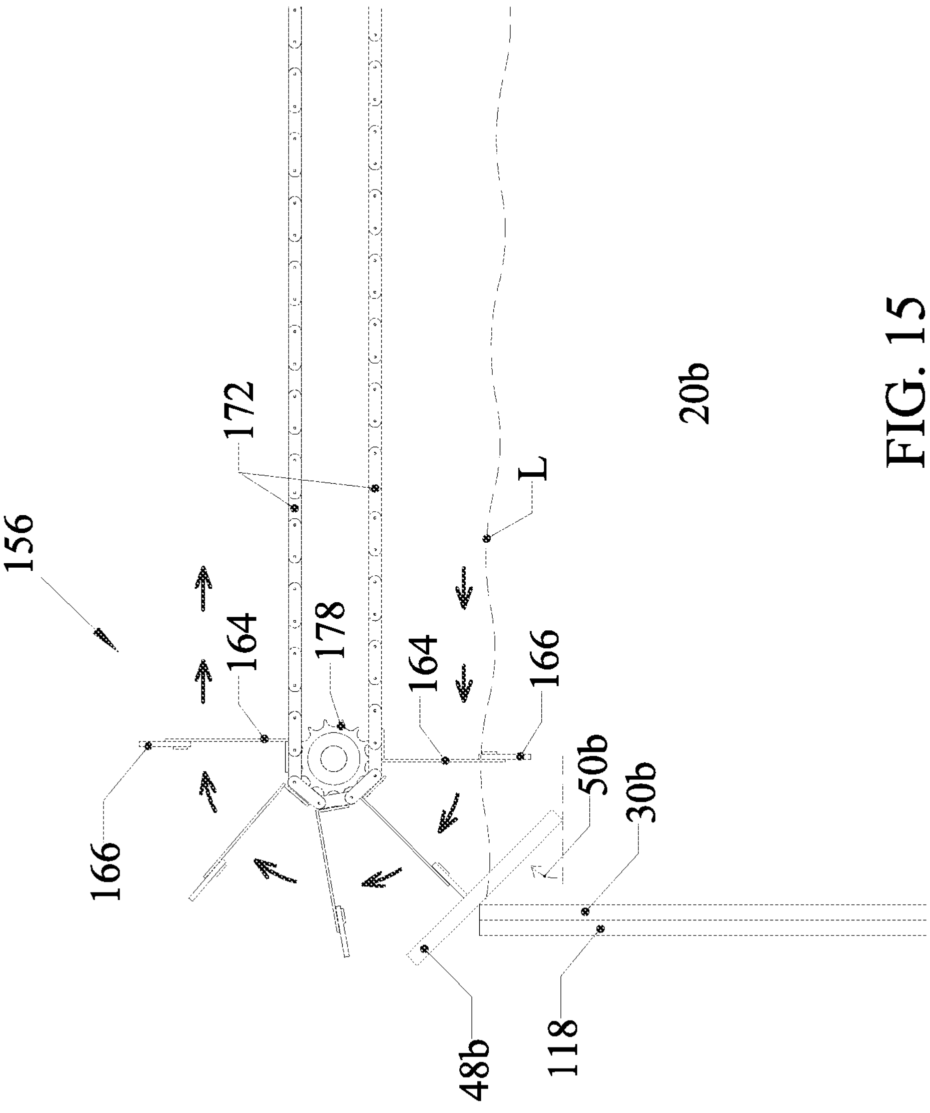
FIG. 15 shows a side view of the back end of a surface skimmer of a first embodiment.
Figure 16:
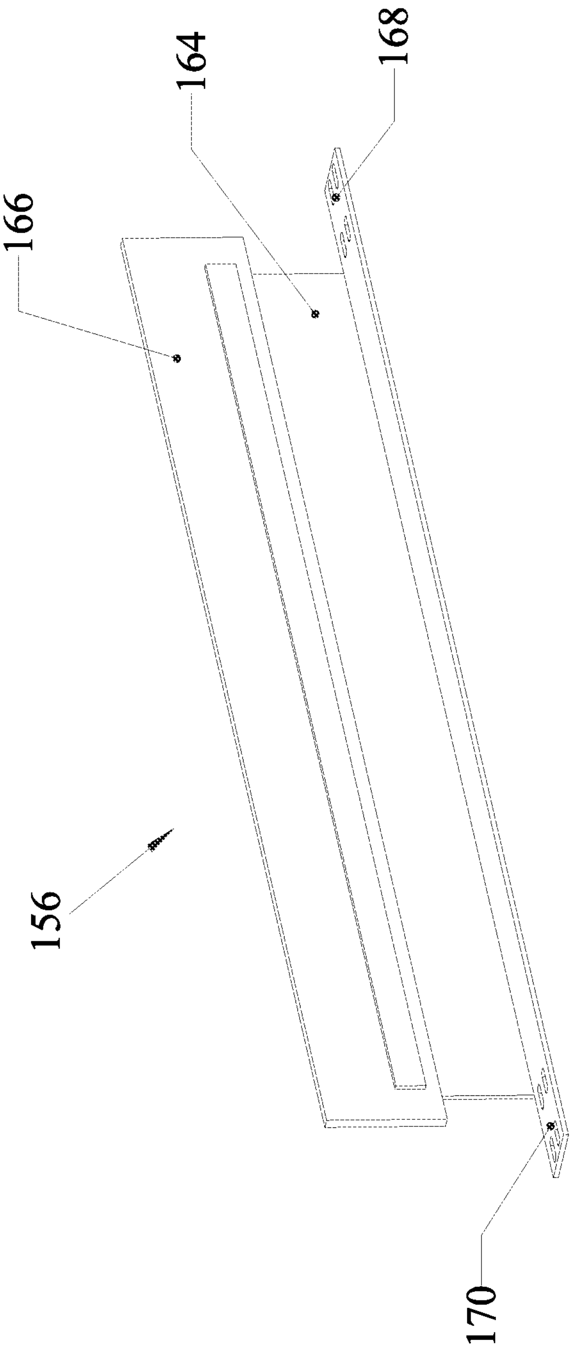
FIG. 16 shows a perspective view of a skimmer paddle of a first embodiment.
Figure 17:
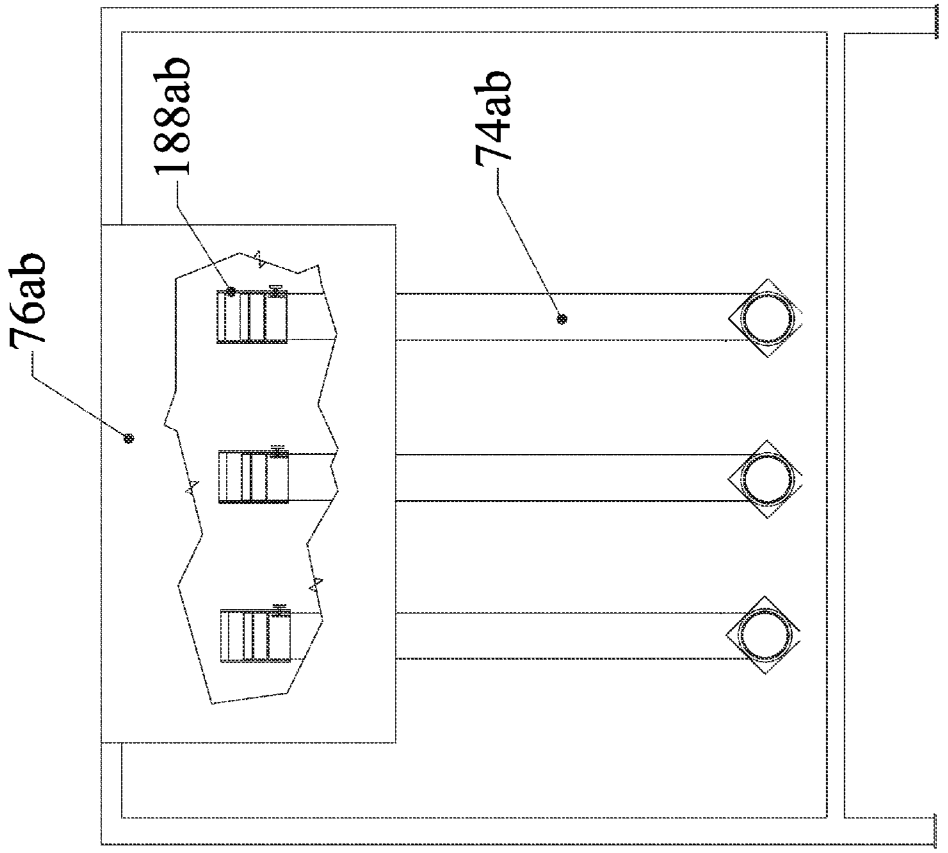
FIG. 17 shows a cutaway side view of an adjustable height riser of a first embodiment.
Figure 18:
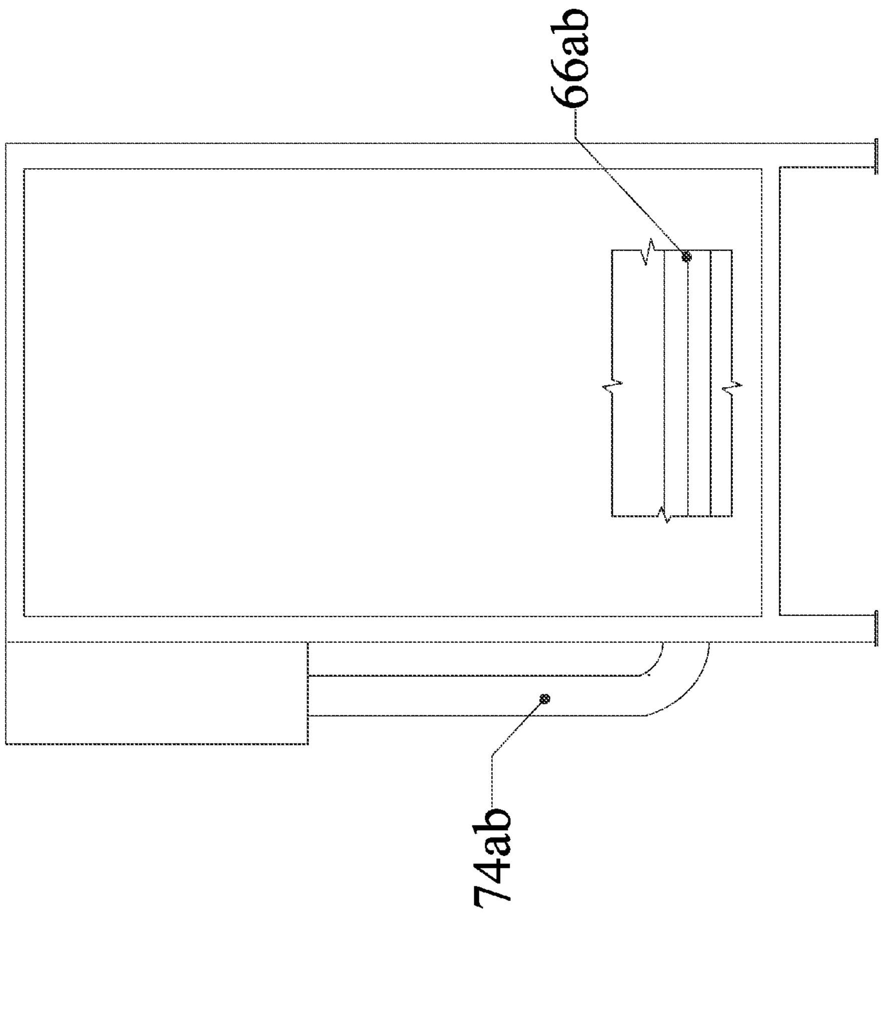
FIG. 18 shows a cutaway front view of an effluent weir and clear well of a first embodiment.
Figure 19:
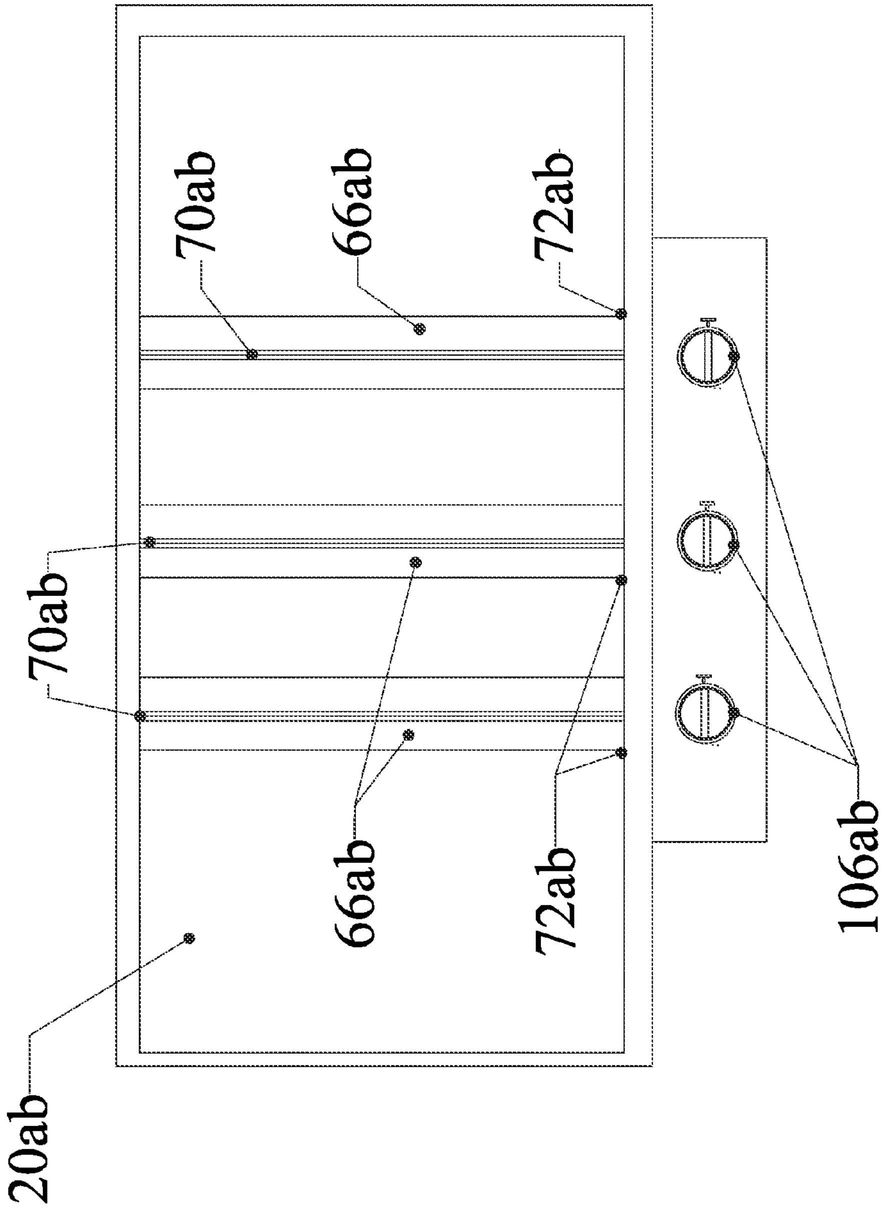
FIG. 19 shows an overhead view of effluent weirs and a clear well of a first embodiment.
Figure 20:
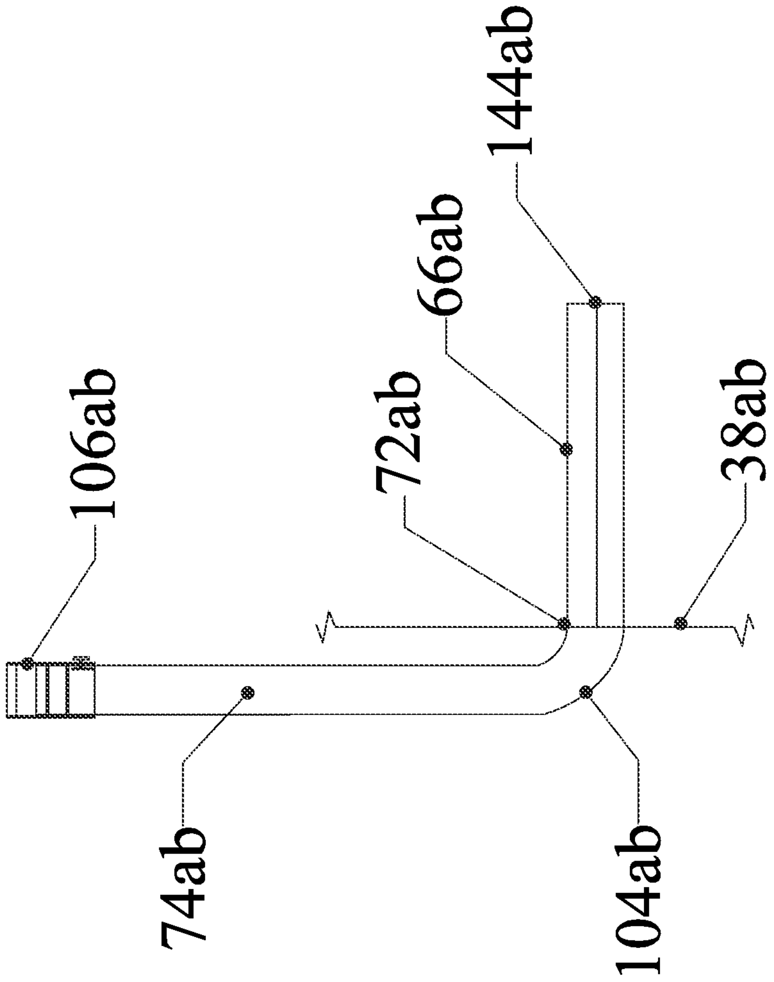
FIG. 20 shows an isolated front view of an effluent weir, adjustable riser and clear well of a first embodiment.
Figure 20A:
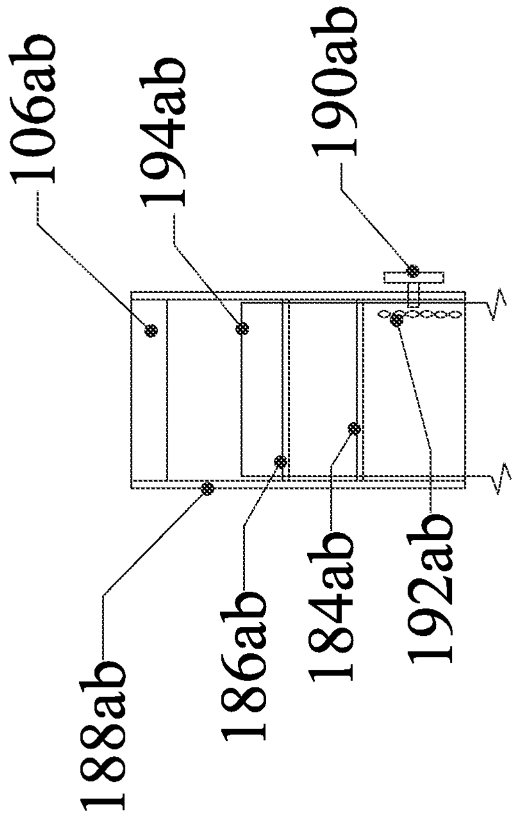
FIG. 20A shows detail cutaway view of an adjustable height riser of a first embodiment.
Figure 20B:
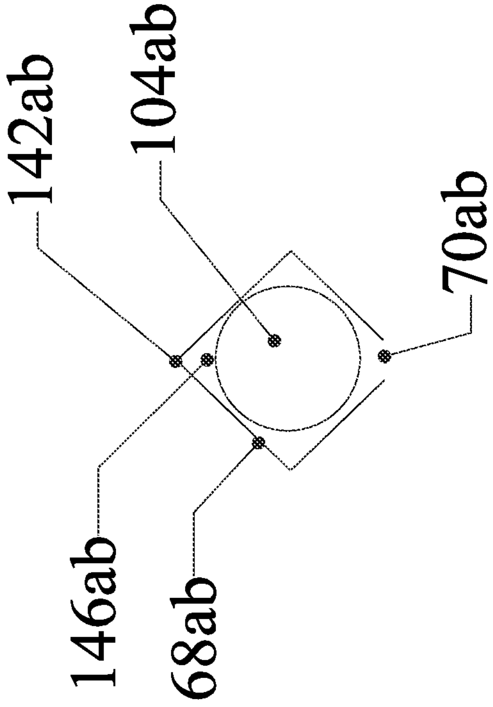
FIG. 20B shows a detail view of a riser coupled to an effluent weir of a first embodiment.
Figure 21:
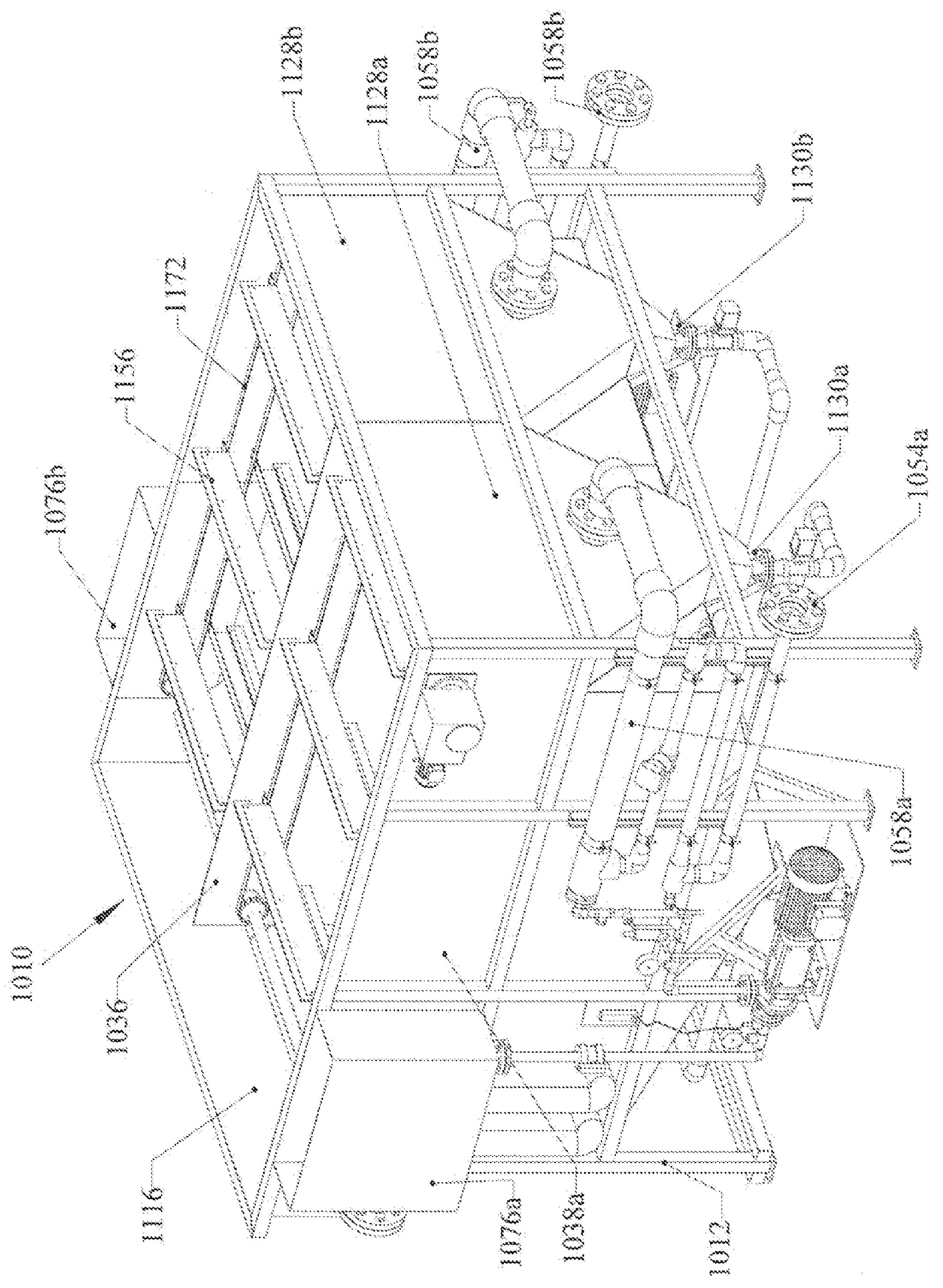
FIG. 21 shows an overhead perspective view of a second embodiment.
Figure 22:
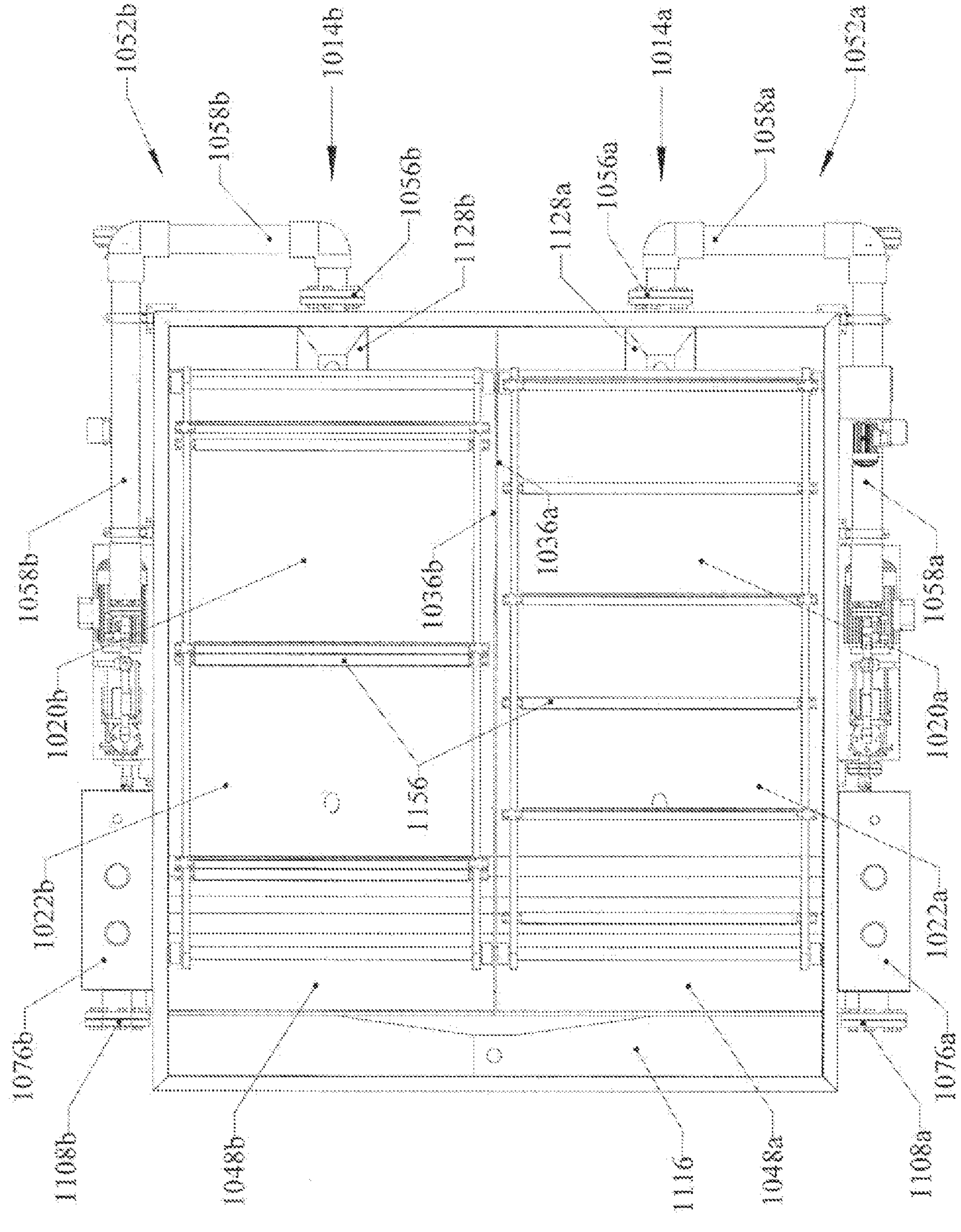
FIG. 22 shows a plan view of a second embodiment.
Figure 23:
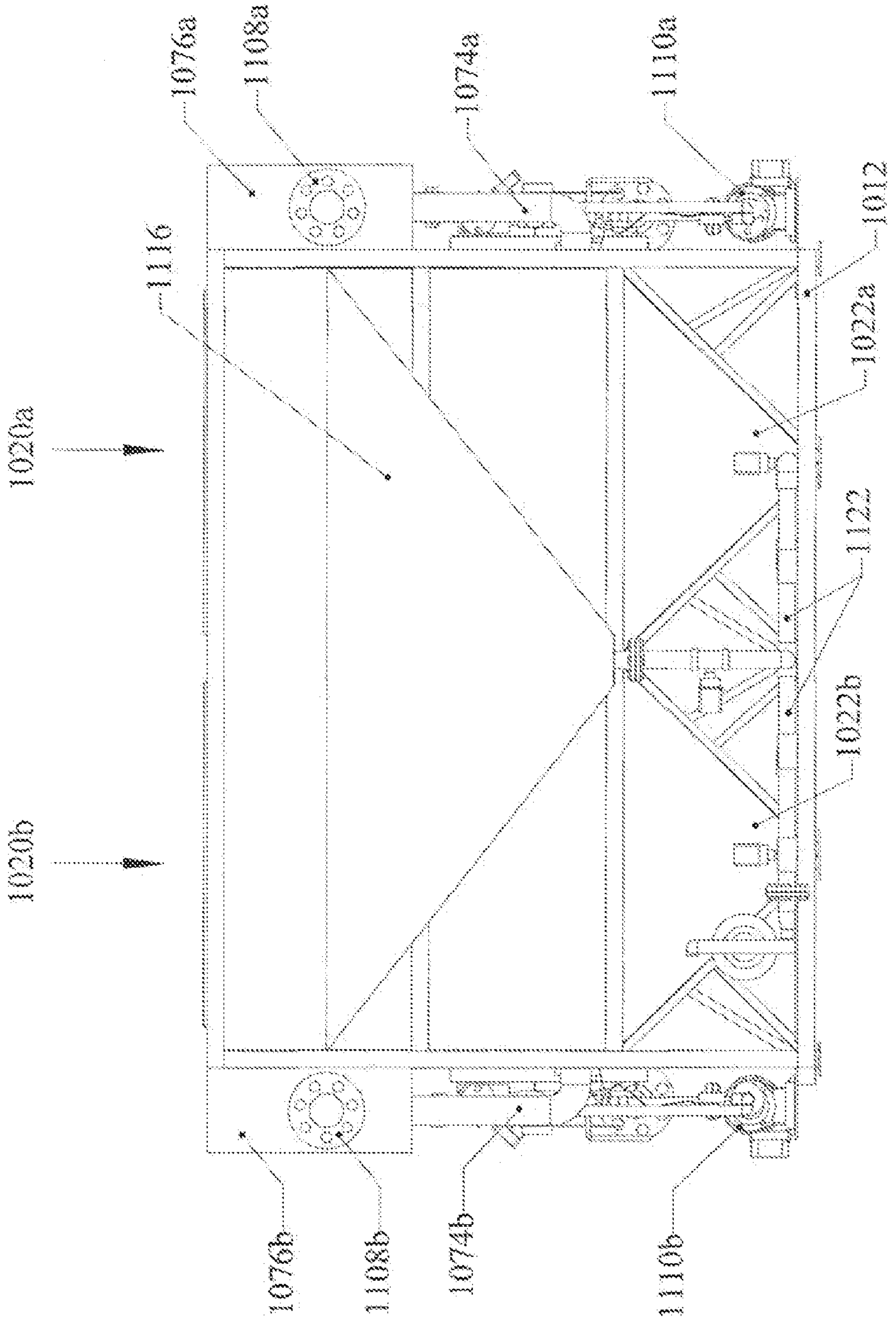
FIG. 23 shows a front elevation view of a second embodiment.
Figure 24:
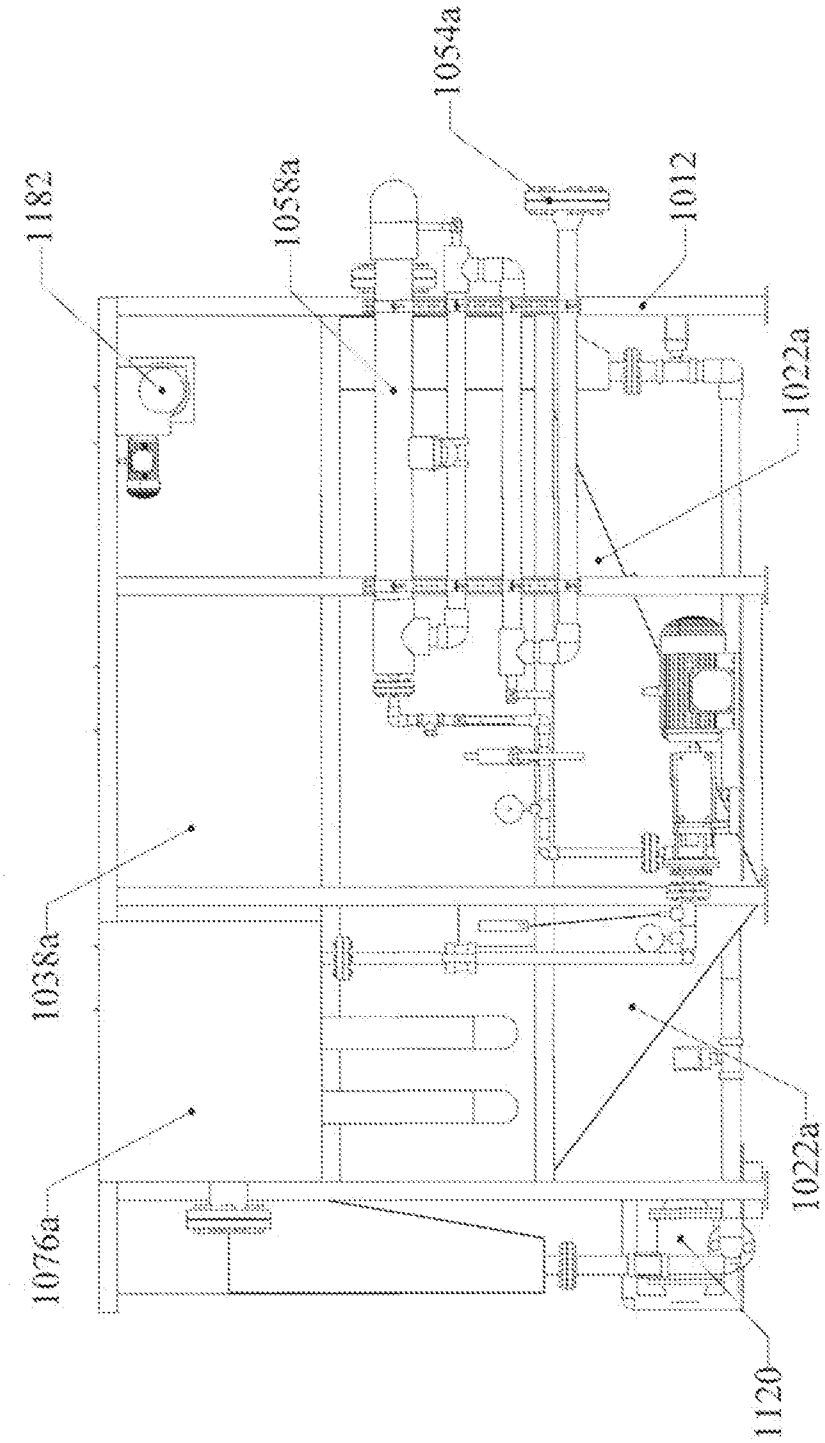
FIG. 24 shows a side elevation view of a second embodiment.
Figure 25:
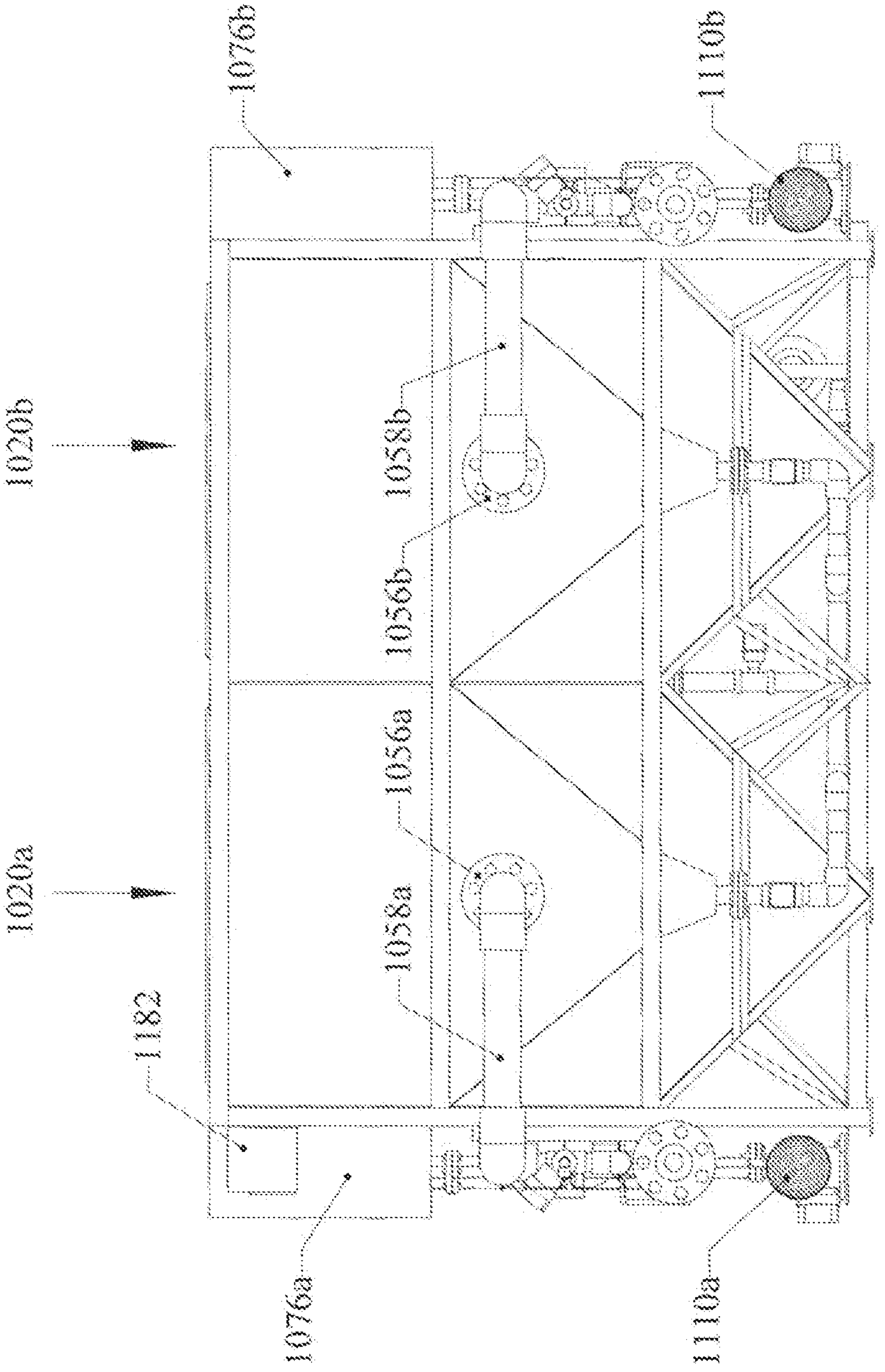
FIG. 25 shows rear elevation view of a second embodiment.

Referring to FIGS. 14-16, the angle 50*ab* of each sludge plate 48*ab* is preferably in the range of 30° to 50° pitch, inclined away from separation tank first end wall 24*ab* and toward sludge collection section 18, so that surface skimmer 16 can easily push retentate up and over into sludge hopper 116 while minimizing the amount of water lost.

Referring to FIGS. 5, 6, 8 and 9, first and second separation tank inside side walls 36*a* and 36*b* form a common inside side wall 36. In the embodiment, first and second inside side walls 36*a* and 36*b* are joined parallel plates with an air gap separating them of approximately 2 to 4 inches (50 to 100 mm), to prevent leakage between tanks and to provide a leak detection space.

Referring to FIGS. 5-9, a first embodiment includes a separator tank plate pack 122*ab* mounted within separation tank 20*ab*, the separator plate pack 122*ab* including a plurality of spaced apart parallel plates 124*ab* oriented at a non-vertical angle, preferably in the range of 45° to 65° pitch, and having their top edges 126*ab* below the level of the skimmer 16. The plate pack 122*ab* provides additional separation efficiency by enhancing laminar flow, and providing increased surface area to cause particle agglomeration and bubble adherence, so that heavier particles and lighter flocculate separate, the heavier particles sinking more quickly and the lighter particles rising to the surface to be skimmed off.

Figure 2:
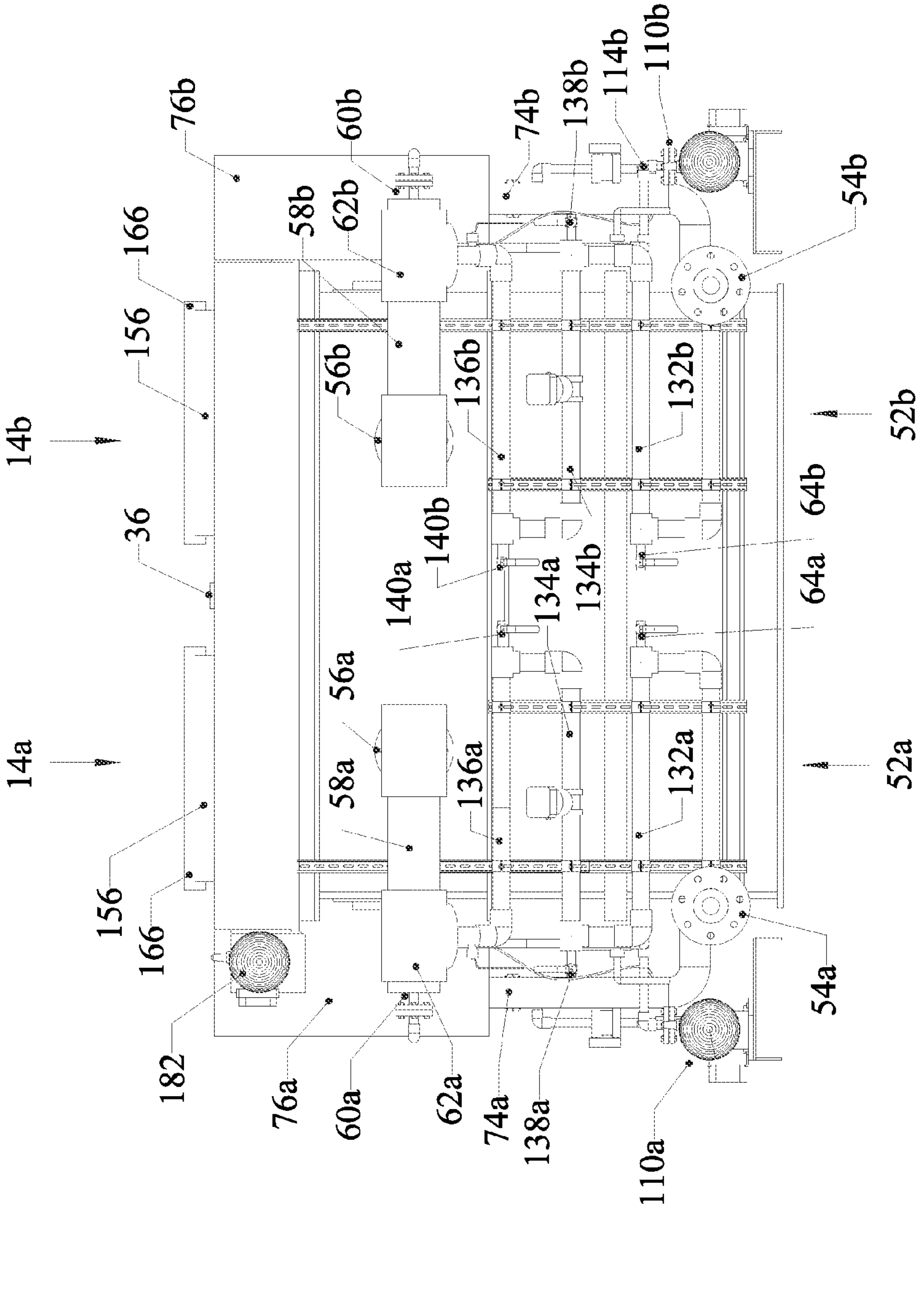
FIG. 2 shows a front end elevation view of a first embodiment.
Figure 3:
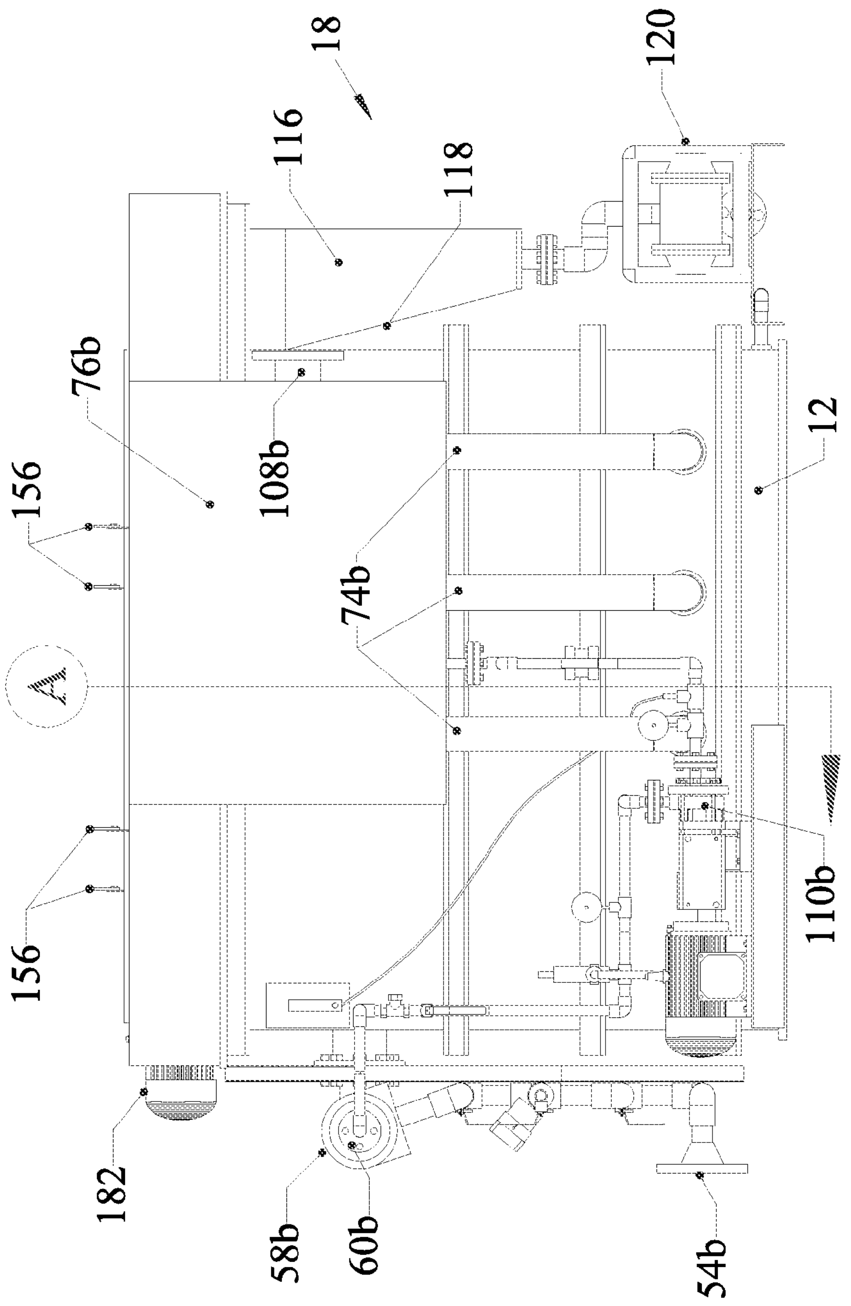
FIG. 3 shows a side elevation view of a first embodiment.
Figure 4:
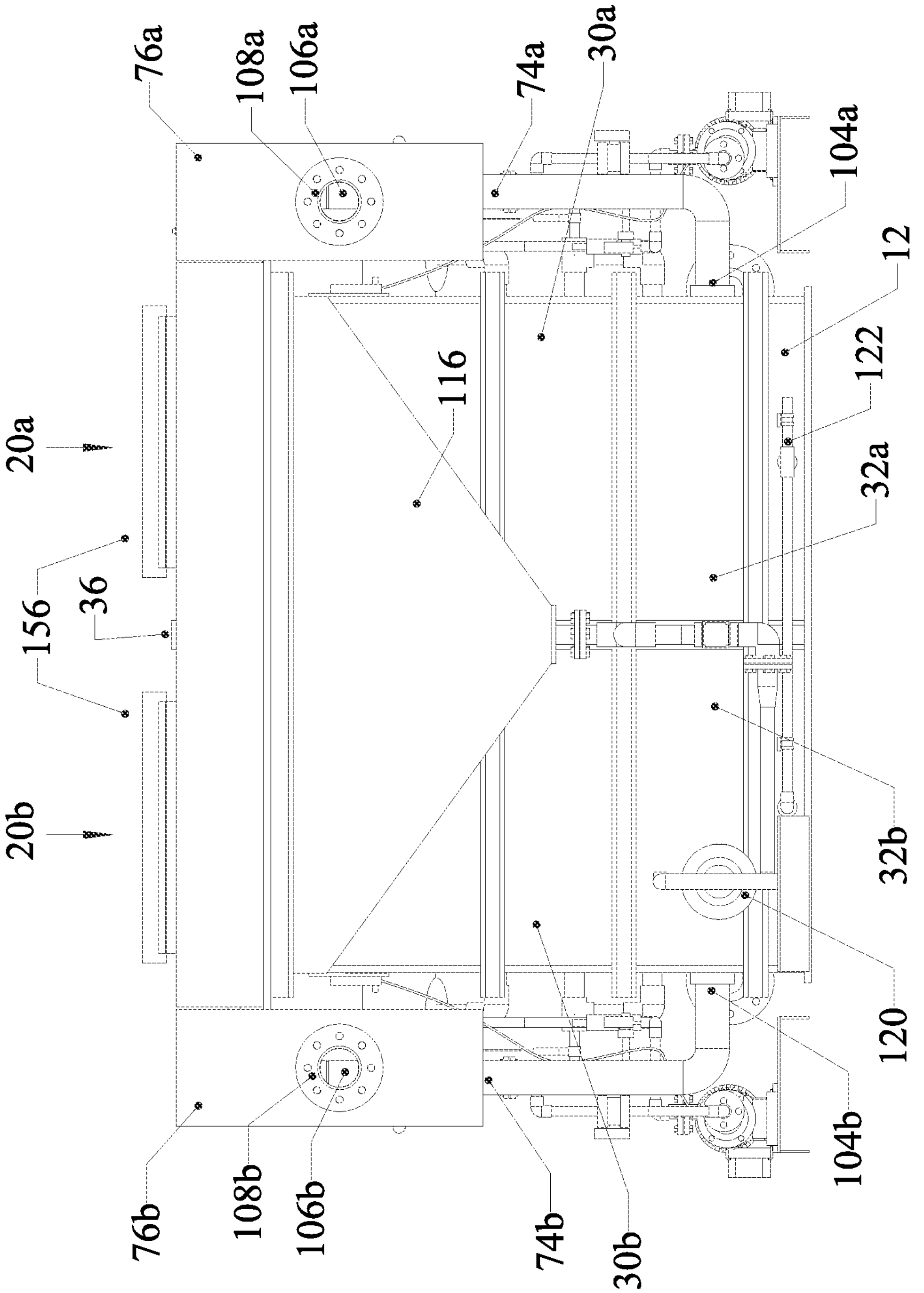
FIG. 4 shows a back end elevation view of a first embodiment.
Figure 5:
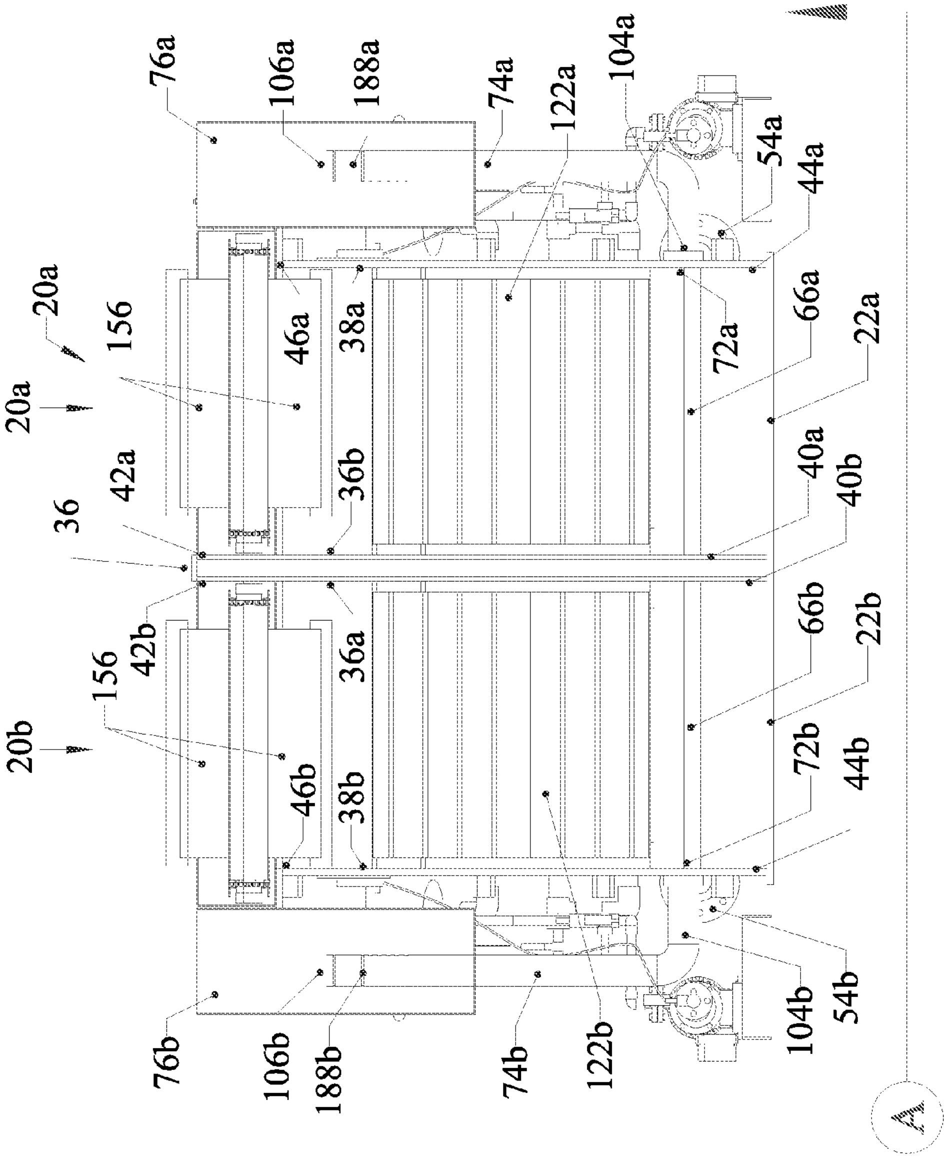
FIG. 5 shows a cutaway view of a first embodiment.

Referring to FIG. 2, in the first embodiment, each flocculator portion 52*ab* includes a plurality of stages 132*ab*, 134*ab* and 136*ab* in series. In the embodiment, each stage 132*ab*, 134*ab* and 136*ab*, respectively, comprises a horizontal pipe run having a chemical injection port 64*ab*, 138*ab* and 140*ab*, respectively, located proximal to its upstream end. The aeration injection port 60*ab* is located downstream of the final chemical injection port 140*ab* and immediately prior to the aeration mixing chamber 58*ab*, so that the chemicals are mixed prior to injection of air saturated water. Chemical injection ports 132*ab*, 134*ab* and 136*ab* may also be used for sampling or as clean out ports during maintenance. The multistage flocculator portion 52*ab* may be used to inject different flocculate agents at different points, or smaller doses of flocculate agent at different times. Alternatively, the plurality of stages may simply be operated as a single long stage using a single chemical injection port 64*ab*. Each stage is oriented approximately 180° from the preceding stage, such that the tortuous pathway allows a longer pipe run—and hence longer dwell time within the pipe—in a smaller space, and provides for more thorough mixing. In the embodiment the elongated flocculator portion provides a dwell time of between 5 seconds and 120 seconds, depending on selected flow rates. In the embodiment, aeration mixing chamber 58*ab* comprises an elongated horizontal pipe section having a larger cross section than each of the plurality of stages 132*ab*, 134*ab* or 136*ab*, and is aligned 180° from the final chemical stage 136*ab*. Aeration injection port 60*ab* is positioned at the upstream end of aeration mixing chamber 58*ab* and aligned to inject aerated water in line with the flow of pre-treated water through the aeration mixing chamber 58*ab*.

Figure 6A:
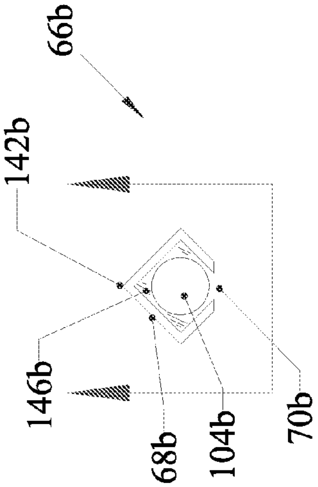
FIG. 6A shows a cross section of an angular weir.
Figure 6:
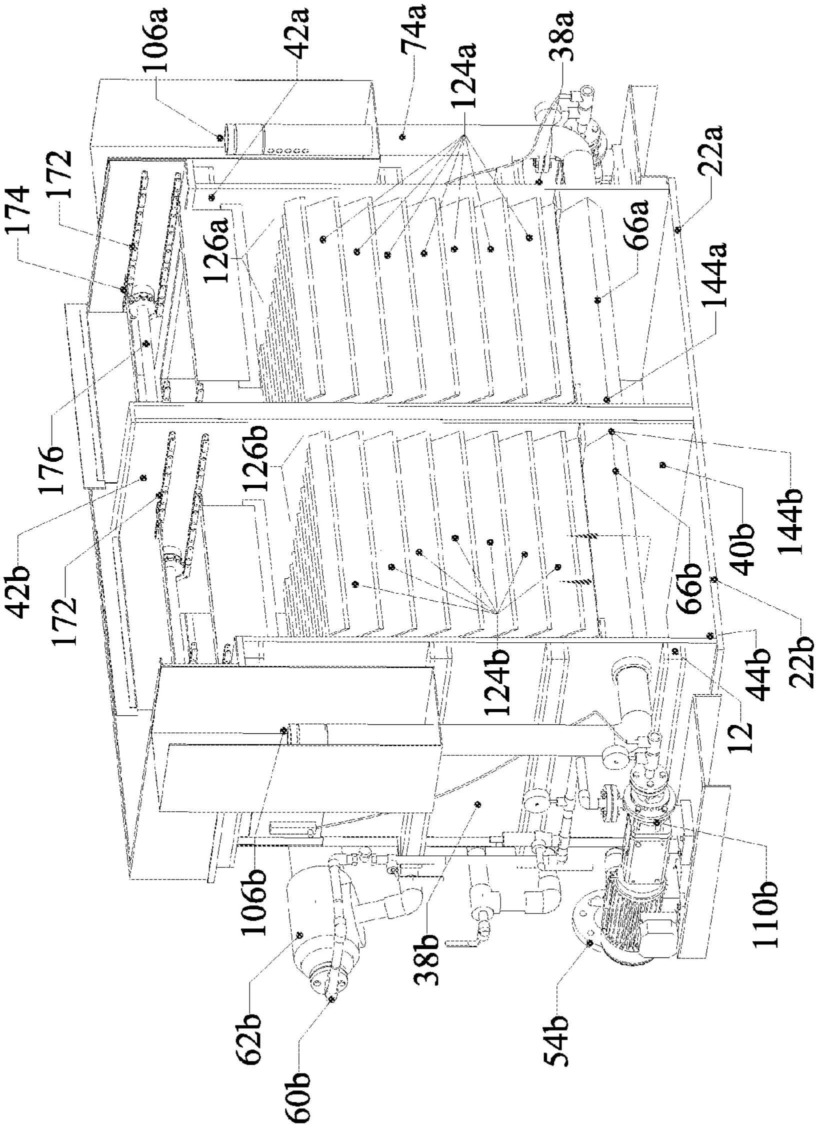
FIG. 6 shows a perspective view of the cutaway view shown in FIG. 5.
Figure 7:
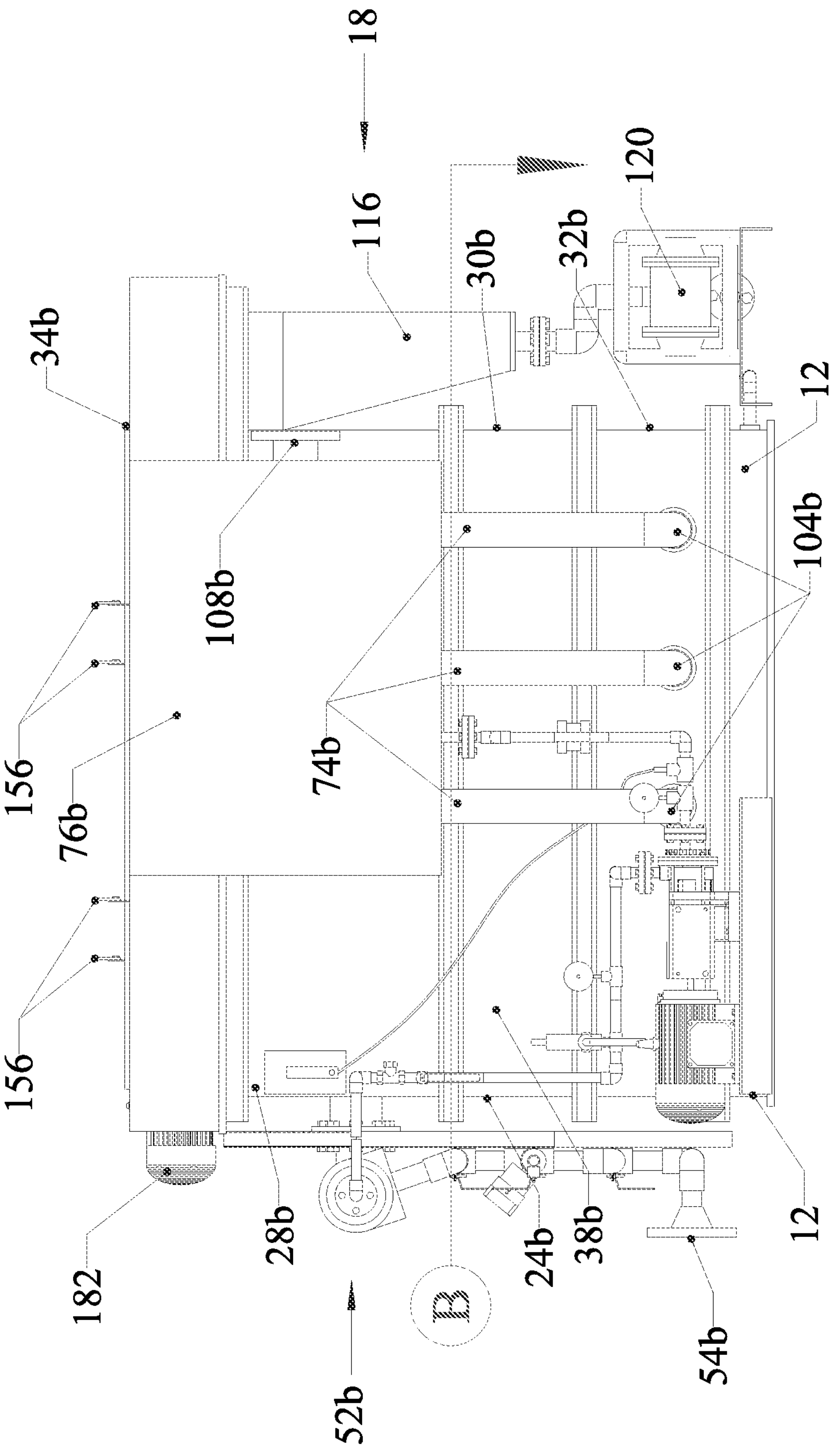
FIG. 7 shows a side elevation view of a first embodiment, as in FIG. 3.
Figure 8:
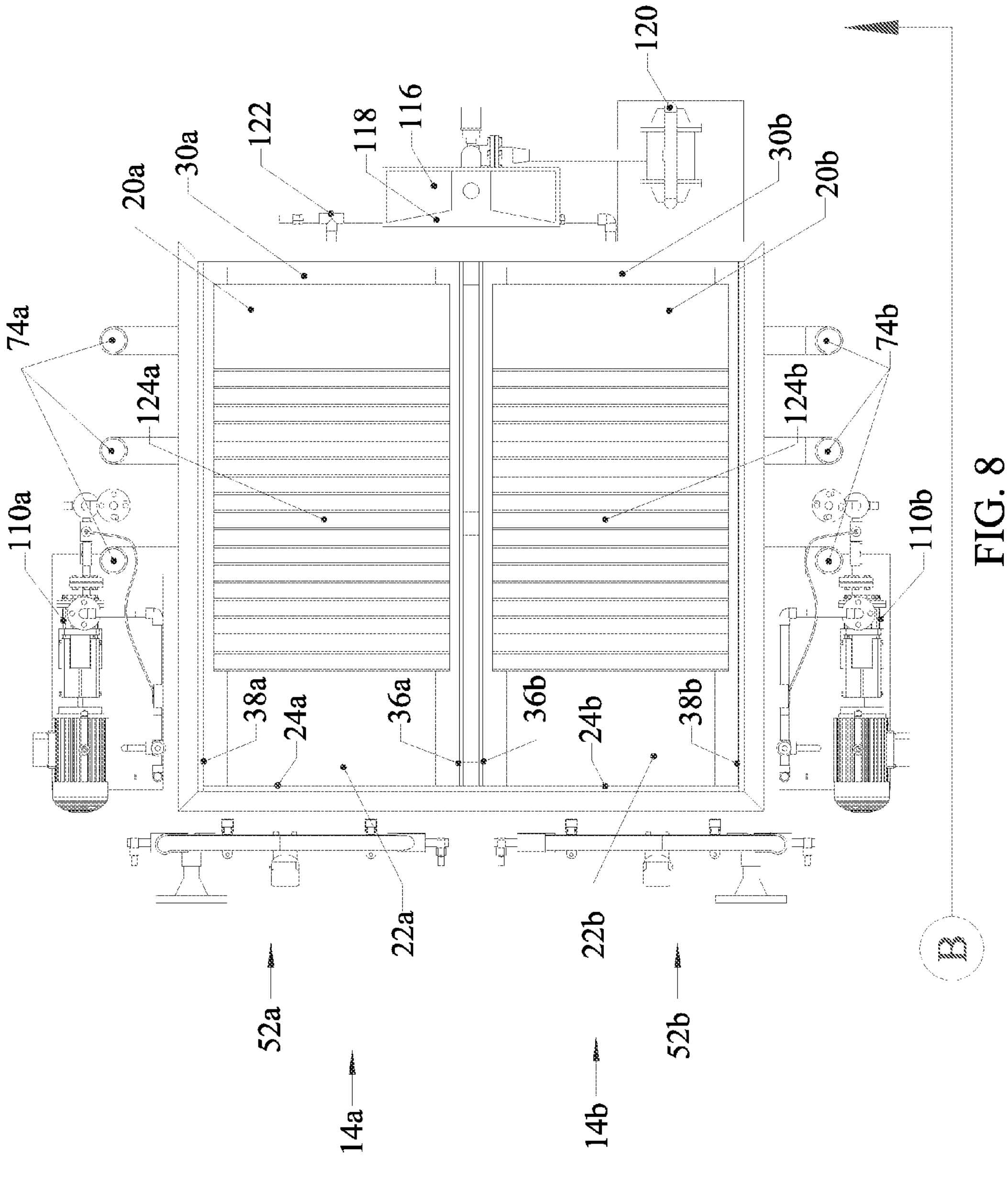
FIG. 8 shows a plan view of the cross cut indicated in FIG. 7.
Figure 9:
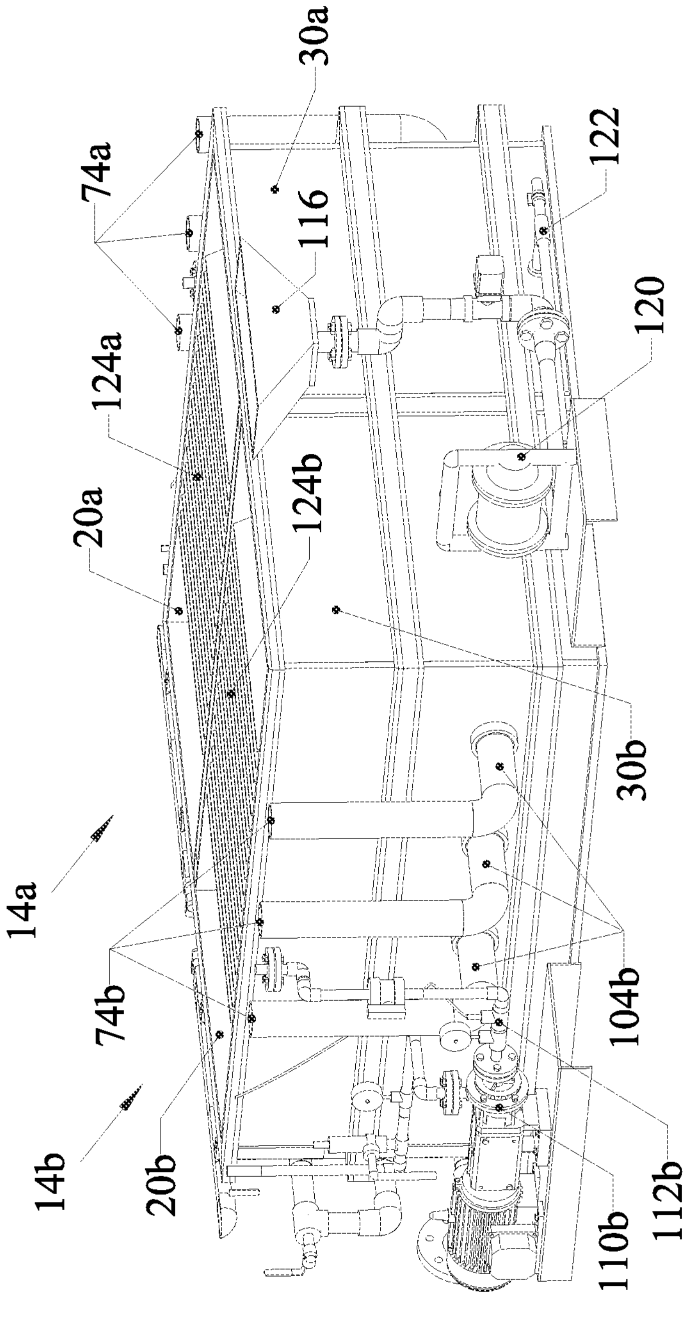
FIG. 9 shows a perspective view of the cutaway view shown in FIG. 8.
Figure 10:
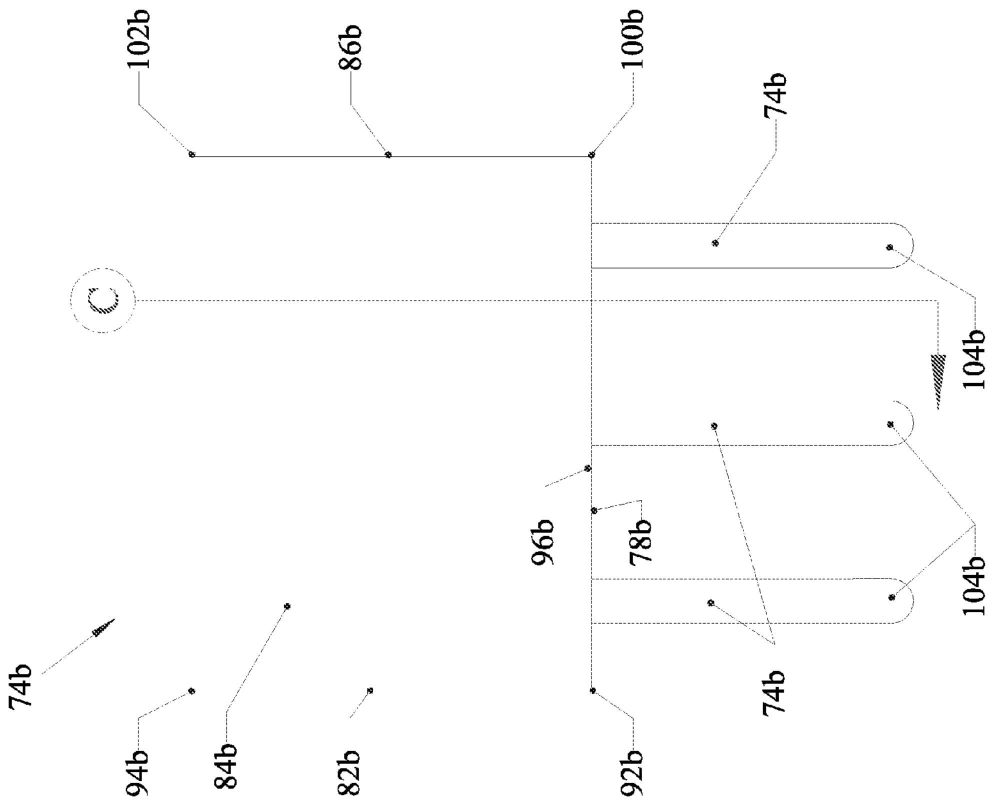
FIG. 10 shows a side view of a clear well and adjustable risers of a first embodiment.
Figure 11:
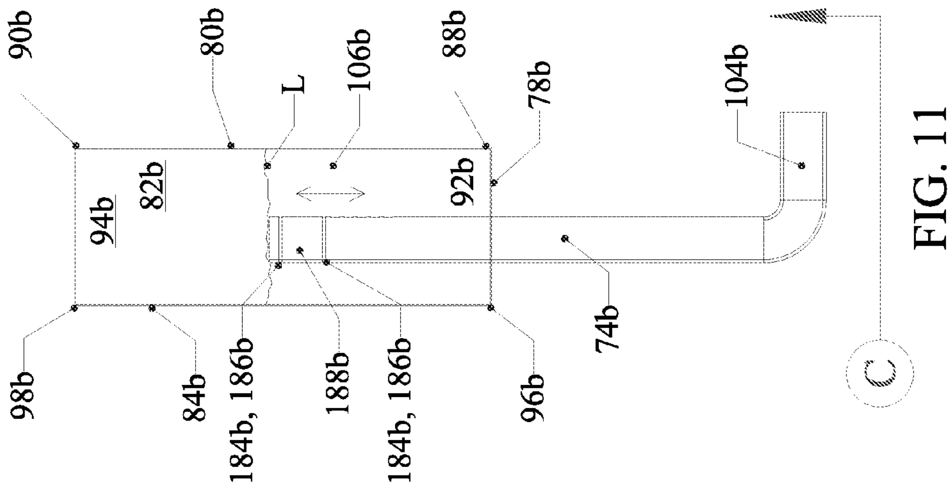
FIG. 11 shows a cutaway end view of a clear well and adjustable risers of a first embodiment.
Figure 12:
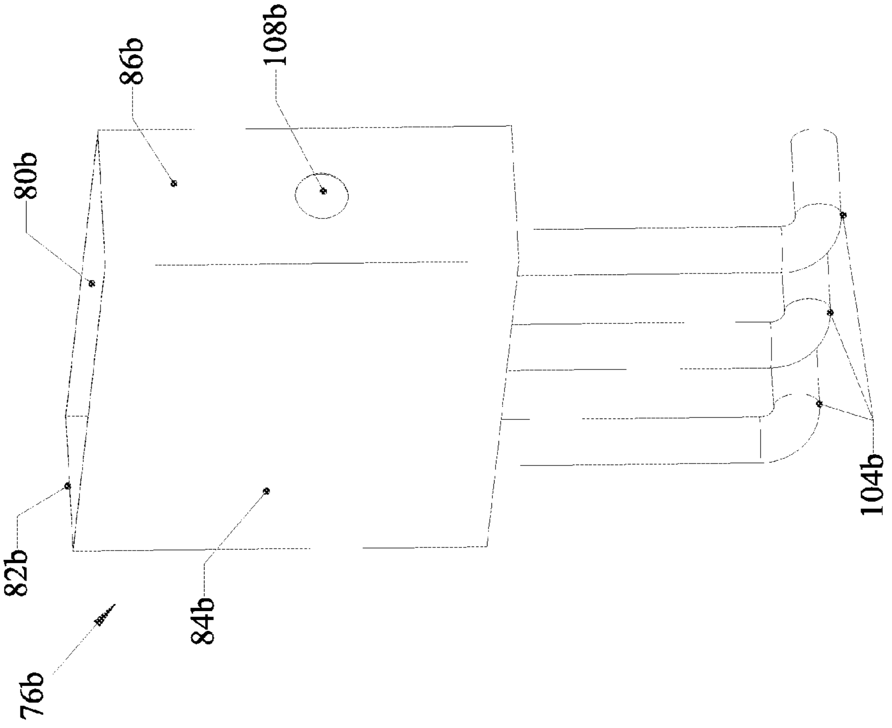
FIG. 12 shows a perspective view of a clear well and adjustable risers of a first embodiment.
Figure 13:
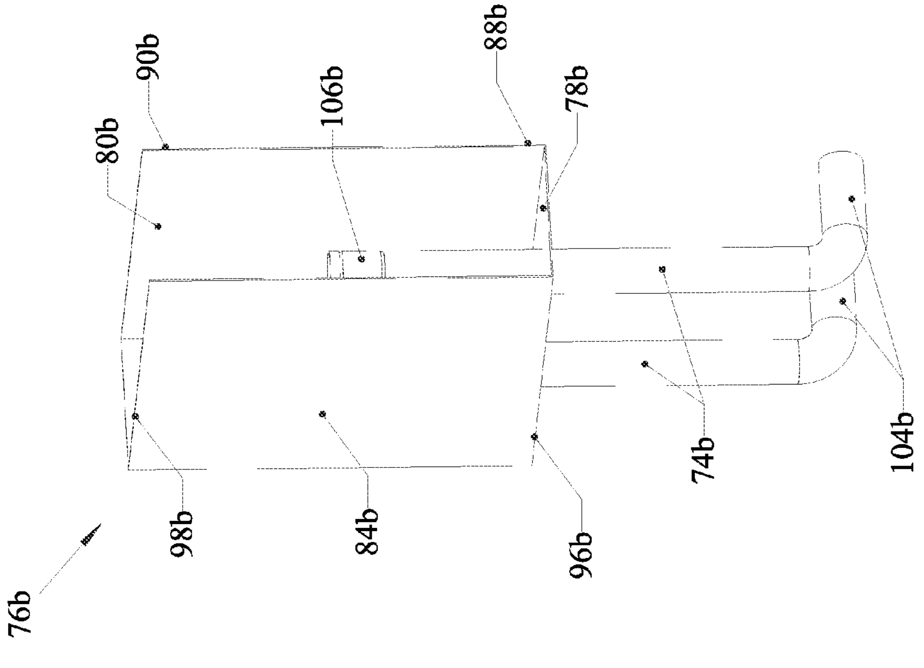
FIG. 13 shows a perspective view of the cutaway view of FIG. 11.

Referring to FIGS. 6 and 6A, in the first embodiment effluent weir 66*ab* is an elongated pipe section with a closed top portion 68*ab* having an upward peaked top with apex 142*ab* extending the length of the pipe section. In the embodiment, effluent weir 66*ab* extends from a closed end 144*ab* proximal to common inside side wall 36 to the effluent weir discharge 72*ab* proximal to outside side wall 38*ab*. As shown in FIGS. 6A and 17-20B, in the embodiment the cross section of effluent weir 66*ab* is essentially a diamond shape, with apex 142*ab* up, and with the bottom apex open where bottom inlet 70*ab* is located. The peaked top prevents sediment from accumulating on the top of the weir. In the embodiment, the interior cross section of effluent weir 66*ab* is greater than that of clear well riser lower portion 104*ab*, creating a small dead volume 146*ab* where errant flocculate is trapped rather than flowing into clear well riser 74*ab*.

Referring to FIGS. 9-13 and 17-20B, the height of clear well riser discharge 106*ab* is adjustable in order to adjust the operating level L of the system 10. Clear well riser 74*ab* includes an open riser end 194*ab*, a plurality of dimples 190*ab* distributed vertically and a plurality of scored grooves 184*ab* around its circumference to receive sealing members 186*ab*, in the embodiment gaskets or o-rings, to seal against a separable adjustable weir discharge member 188*ab* which mounts over the end of riser 74*ab* and seals against o-rings 186*ab*. Set screw 190*ab* threads through separable weir discharge member 188*ab* selectively engaging dimples 192*ab* to set the discharge height. In the embodiment, a plurality of horizontal effluent weirs 66*ab* and corresponding clear well risers 74*ab* is provided, oriented transversely across the lower portion of separation tank 20*ab*, which enhances even and laminar flow through separation tank 20*ab* and reduces water velocities to permit maximum separation of particulates from the water stream. Each of clear well riser discharges 106*ab* is height adjustable.

Referring to FIGS. 1-9, in the first embodiment the aeration injector is an aeration turbine pump 110*ab* taking its primary suction from clear well 74*ab* via supply line 148*ab*, recycling from 10% to 50% of the effluent flow. When operating at continuous flow conditions, aeration turbine pump 110*ab* will supply aerated water in the range 20-100 psig, fed by either ambient or compressed air based on operator selection. Under these conditions pump 110*ab* will generate gas bubbles in the range 20 to 30 microns at a gas saturation rate of 8-10% by volume of the recirculated water flow. Normal system operating temperatures are in the range of approximately 32° F. to 210° F. (0° C. and 99° C.) for water treatment (i.e. approximately freeze point to boiling point).

In the first embodiment, surface skimmer 16 comprises paddles 156 coupled to a cyclical drive train, the paddles 156 travelling longitudinally along the surface L of the liquid in the separation tank 20*ab* to push retentate over sludge plate 48*ab*. First cyclical drive mechanism 150 is mounted above first treatment section separation tank 20*a* and extends from a first drive mechanism first end 152 which is approximately at the first separation tank first end wall 24*a* to a first drive mechanism second end 154 which is approximately at the first separation tank second end wall 30*a*. A first group of paddles 156 is coupled to first skimmer drive mechanism 150 to extend transversely across the width of first treatment unit separation tank 20*a*. Like the first cyclical drive mechanism, a second cyclical drive mechanism 158 is mounted above the second treatment section separation tank 20*b* and extends from a second drive mechanism first end 160 which is approximately at the second separation tank first end wall 24*b* to a second drive mechanism second end 162 which is approximately at the second separation tank second end wall 30*b*. A second group of paddles 156 is coupled to first skimmer drive mechanism 150 to extend transversely across the width of second treatment unit separation tank 20*b*. First and second cyclical drive systems 150 and 158, respectively, cyclically move each paddle 156 of the respective first and second groups of paddles from approximately the first and second treatment section first end walls 24*a* and 24*b*, respectively, to approximately the first and second treatment section second end walls 30*a* and 30*b*, respectively, and over the respective sludge plates 48*a* and 48*b* to skim retentate from the surface of water in the separation tanks 20*a* and 20*b*. In the embodiment, first and second cyclical drive mechanisms are closed loop chain drives, each having a pair of parallel chains 172 engaged by drive sprockets 174 coupled to a common drive shaft 176 and idler sprockets 178 coupled to a common idler shaft 180. Skimmer drive motor 182 is coupled to common drive shaft 176 to cycle the chain drives.

Each paddle 156 includes a rigid coupling flange 164 adapted to couple to a cyclical drive mechanism 150 or 158, and a flexible wiper 166 coupled to and extending beyond rigid coupling flange 164. In the embodiment, rigid coupling flange 164 has opposing wing flanges 168 and 170 which are bolted directly to chains 172. Flexible wipers 166 engage against sludge plate 48*ab* to force retentate against and then over sludge plate 48*ab* into sludge hopper 118 and to compress clean water from the retentate as it is forced up the inclined sludge plate 48*ab*. Surface skimmer 16 is mounted at a height such that paddles 156 will extend into the liquid several inches below the operating level L throughout the anticipated range.

In an alternative arrangement, first and second treatment sections 14*a* and 14*b* may be used for sequential treatment by aligning the clear well effluent discharge 108*ab* from one treatment section to the inlet 54*ab* of the adjacent unit. A temporary pump may be installed in the interconnection to improve flow.

Referring to FIGS. 21-25 a second embodiment of a modular dual vessel dissolved aeration flotation treatment system 1010 is shown. The second embodiment is generally similar to the first embodiment, having a frame 1012, first and second treatment sections 1014*a* and 1014*b* mounted to frame 1012 adjacent each other, a surface skimmer 1016 mounted to the first and second treatment sections 1014*ab*, and a sludge collection section 1018. First and second treatment sections are essentially identical and items shall be referred to as "a" and "b", as described in the first embodiment.

Each of the first and second treatment sections 1014*ab* includes a separation tank 1020*ab*, having a volume defined by a bottom wall 1022*ab*, first and second end walls 1024*ab* and 1030*ab*, respectively, and inside and outside side walls 1036*ab* and 1038*ab*, respectively, with inside walls 1036*a* and 1036*b* forming a common inside wall 1036. In the embodiment, bottom wall 1022*ab* is formed from inclined plates to enhance sediment removal. Inside and outside side walls and first and second end walls, 1036*ab*, 1038*ab*, 1024*ab* and 1030*ab*, respectively, connect to bottom wall 1022*ab* at their bottom portions 1040*ab*, 1044*ab*, 1026*ab* and 1032*ab*, respectively, and extend vertically to their top portions 1042*ab*, 1046*ab*, 1028*ab* and 1034*ab*, respectively. Sludge plate 1048*ab* extends at an incline from the interior volume of separation tank 1020*ab* below the operating level L of the system 1010 over the abutting sludge hopper 1116 of sludge collection section 1018. Sludge plate 1048*ab* is preferably inclined at an angle in the range 30° to 50° from horizontal.

Flocculator portion 1052*ab* includes an inlet 1054*ab*, an outlet 1056*ab* to discharge into separation tank 1020*ab*, aeration mixing chamber 1058*ab* disposed between the flocculator portion inlet 1054*ab* and outlet 1056*ab*, an aeration injection port 1060*ab* proximal to the upstream end of aeration mixing chamber 1058*ab*, and chemical injection ports 1064*ab* and 1140*ab* between inlet 1054*ab* and aeration injection port 1060*ab*. Flocculator portion 1052*ab* includes two horizontal stages 1132*ab* and 1134*ab*, with first and second stage chemical injection ports 1064*ab* and 1138*ab*, respectively. Effluent weirs 1066*ab* within separation tank 1020*ab* in fluid communication with clear well risers 1074*ab* at clear well riser bottom portions 1104*ab* direct flow of clean effluent into clear well 1076*ab*, each of which is positioned adjacent its respective separation tank 1020*ab* on the common frame 1012. In the second embodiment two effluent weirs 1066*ab* and corresponding clear well risers 1074*ab* are provided for each clear well 1076*ab* on this smaller capacity unit, located proximal to the bottoms of the separation tank sidewalls and end walls but above the region where separation tank bottom wall 1022*ab* slopes downward to prevent ingestion of sediments. Clear well discharge 1108*ab* directs clarified effluent out of the system for further processing or reuse. Aeration turbine pump 1110*ab* takes suction 1112*ab* from clear well 1076*ab* via supply line 1148*ab* to recycle effluent, and injects the aerated effluent into aeration injection port 1060*ab* proximal to the upstream end 1062*ab* of aeration mixing chamber 1058*ab*.

Again referring to FIGS. 21-25, a second embodiment includes a stilling well 1128*ab* mounted to each separation tank 1020*ab* to receive the pre-treated flow from flocculator portion discharge 1056*ab* and discharge this flow into the volume of separation tank 1020*ab* at a lower velocity, and to evenly distribute the flow transversely across separation tank 1020*ab*. Stilling well 1128*ab* essentially blocks direct flow from the flocculator portion, which is pressurized, in order to increase the dwell time, enhance the laminar flow characteristics within the separation tank, prevent bubbles from being stripped from particles by the higher velocity water, and cause heavier particles to immediately separate. In the second embodiment, stilling wells 1128*ab* include angled bottoms with drains 1130*ab* which can be aligned to sludge pump 1120 to remove sediment buildup.

In the second embodiment, surface skimmer 1016 is similar to the first embodiment, having dual chain drives 1150 and 1158 with chains 1172 coupled to paddles 1156 with rigid coupling flanges 1164 and flexible wiper portions 1166. Drive motor 1182 couples to drive shaft 1176 and drive sprockets 1174 to cycle chains 1172. The paddles 1156 push retentate to sludge plate 1048*ab* and the flexible wipers 1166 engage against sludge plate 1048*ab* to concentrate and partially dewater retentate as it is pushed over into sludge hopper 1116 with sludge hopper end wall 1118 abutting first and second separation tank second end walls 1130*ab*.

In operation, the described first and second embodiments operate similarly, so the first embodiment will be described in detail. A liquid stream, for example waste water, to be treated is received through inlets 54*ab* and passes through flocculator portion stages 132*ab*, 134*ab* and 136*ab*. Treatment chemicals such as flocculate agents are injected through one or more of chemical injection ports 64*ab*, 138*ab* and/or 140*ab*, to pre-treat the waste water before mixing with aerated water. The chemicals react with particulates in the waste water to create larger, less dense agglomerations of coagulated particles which are more susceptible to binding with air bubbles. The elongated, multi-stage flocculator portion 52*ab* provides a dwell time of 5 to 120 seconds under normal flow conditions. Aeration turbine pump 110*ab* injects clarified effluent saturated with air into the aeration mixing chamber 58*ab* inline with the flow of pre-treated waste water to thoroughly mix with the pre-treated waste water and partially expand to form air bubbles. Pre-treated aerated waste water enters the separation tank 20*ab* through flocculator portion discharge 56*ab*. The waste water flows along the tank 20*ab* and downward along the parallel plates 124*ab* within the plate packs 122*ab* which causes heavier particles to separate and drop to the tank bottom, and lighter particles to which gas bubbles have adhered to rise to the surface. Clean effluent passes into effluent weirs 66*ab* through bottom inlets 70*ab*, through clear well riser lower portions 104*ab* and clear well risers 74*ab*, into clear well 76*ab* through riser discharges 106*ab*. Clarified effluent in clear well 76*ab* is either discharged through clear well discharge 108*ab*, or recycled through aeration turbine pump 110*ab* via supply line 148*ab*. The height of clear well riser discharge 106*ab* determines the operating level L in the system. The total dwell time of the system 10 at normal operating conditions will be in the range 10 minutes to 30 minutes for each treatment section 14*ab*—measured from waste water entry into the flocculator portion inlet 54*ab* to the clear well discharge 108*ab*.

Within separation tanks 20*ab*, flocculates rise to the surface—referred to as retentate. Paddles 156 are cyclically driven along the liquid surface of separation tanks 20*ab* to push retentate toward the back of the tank to the "beach"—i.e. sludge plates 48*ab*. As the retentate is pushed up sludge plates 48*ab* much of the entrained water drains back into the tank 20*ab* and the retentate is concentrated, then pushed over the edge into sludge hopper 116. As sludge accumulates in hopper 116 sludge pump 120 will periodically activate to transfer sludge to a removal container or some other receiver for further processing.

Controls may be provided in a common control panel to control the entire skid, or local controls may be provided, or a combination of both, as is known in the art.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A modular dual vessel dissolved aeration flotation treatment system, comprising:

a frame;

first and second treatment sections mounted to the frame adjacent to each other, each treatment section including:

a separation tank having a volume defined by a bottom wall, opposing first and second end walls each extending from a bottom portion connected to the bottom wall to a top portion, and opposing parallel inside and outside side walls each extending from a bottom portion connected to the bottom wall to a top portion, wherein the first and second treatment section inside side walls form a common inside wall section;

a sludge plate extending transversely from the inside side wall to the outside side wall and extending longitudinally from the interior of the separation tank at a height below the liquid operating level of the system to at least the upper edge of the separation tank second end wall, the sludge plate oriented at an inclined angle from horizontal;

a flocculator portion having an inlet to receive a waste water stream, an outlet to discharge into the separation tank, an aeration mixing chamber disposed between the flocculator inlet and outlet, an aeration injection port proximal to an upstream end of the aeration mixing chamber, and a chemical injection port disposed between the flocculator inlet and the aeration injection port;

an effluent weir mounted within the separation tank at a depth proximal to the bottom portions of the inside and outside side walls but set off from the bottom wall, the effluent weir having an enclosed top portion and a bottom inlet and a discharge in fluid communication with a clear well riser;

a clear well adjacent to the separation tank, the clear well defined by a bottom wall and enclosing side walls, each clear well side wall extending from a bottom portion connected to the clear well bottom wall to a top portion, the clear well further including a clear well discharge to discharge treated water;

a clear well riser extending from a bottom portion in fluid communication with the effluent weir discharge to a riser discharge within the clear well, wherein the height of the riser discharge is lower than clear well side wall top portions and defines the liquid operating level of the system; and, an aeration injector having an inlet in fluid communication with the clear well and a discharge in fluid communication with the flocculator aeration injection port;

a surface skimmer mounted to the first and second treatment sections; and, a sludge collection section adjacent the second end walls of the first and second treatment sections to receive retentate from the surface skimmer;

wherein, the first treatment section and second treatment section may operate independently of each other.

2. The system of claim 1, further comprising:

wherein the angle of each of the sludge plates of the first and second separation tanks is angled within the range 30° to 50° pitch.

3. The system of claim 1 wherein the common inside wall of the first and second separation tanks further comprises opposing first and second parallel plates separated by an air gap.

4. The system of claim 1 wherein each treatment section further comprises a separator plate pack mounted within the separation tank, the separator plate pack including a plurality of spaced apart parallel plates having their top edges below the level of the skimmer and oriented at a non-vertical angle.

5. The system of claim 1, wherein each treatment section further comprises a stilling well mounted to each separation tank to receive the flow from the flocculator portion discharge and discharge this flow to the separation tank volume at a lower velocity.

6. The system of claim 1, each flocculator portion further comprising:

a plurality of stages arranged in series, each stage having a chemical injection port proximal to its upstream portion;

wherein the aeration injection port is disposed between the final chemical injection port and the flocculator portion discharge.

7. The system of claim 6, further comprising:

each stage comprising an elongated section of pipe mounted substantially horizontally and oriented approximately 180 degrees from the preceding stage;

the aeration mixing chamber comprises an elongated horizontal pipe having greater cross sectional area than each of the plurality of stages and oriented approximately 180 degrees from the preceding stage; and, the aeration injection port is disposed proximal to the upstream end of, and in line with the longitudinal centerline of, the aeration mixing chamber.

8. The system of claim 1, each effluent weir further comprising an elongated pipe and the enclosed top part having an upward peaked top.

9. The system of claim 1, each effluent weir further comprising:

an elongated pipe extending from a closed end proximal to the common inside side wall to the discharge proximal to the outside side wall, the pipe cross section comprising a diamond shape oriented with an apex on top.

10. The system of claim 8, further comprising:

wherein the pipe cross section is substantially square.

11. The system of claim 8, further comprising:

wherein the interior cross section of the effluent weir extends beyond the interior cross section of clear well riser lower portion.

12. The system of claim 1, further comprising:

wherein the height of the clear well riser discharge within the clear well is adjustable.

13. The system of claim 1, further comprising:

a plurality of clear water weirs and a plurality of clear well risers, each effluent weir discharge in fluid communication with a corresponding clear well riser.

14. The system of claim 13, wherein the height of each of the plurality of clear well riser discharges within the clear well is adjustable.

15. The system of claim 1, wherein the aeration injector comprises an aeration turbine pump.

16. The system of claim 15, wherein the suction of the aeration turbine pump is in fluid communication with the clear well, such that the turbine pump recycles water from the clear well during normal operation.

17. The system of claim 1, the surface skimmer further comprising:

a first cyclical drive mechanism mounted above the first treatment section separation tank and extending from a first end proximal to the first separation tank second end wall to a second end proximal to the first separation tank first end wall;

a first plurality of paddles coupled to the first drive mechanism, each of the first plurality of paddles extending transversely across the first separation tank;

a second cyclical drive mechanism mounted above the second treatment section separation tank and extending from a first end proximal to the second separation tank second end wall to a second end proximal to the second separation tank first end wall;

a second plurality of paddles coupled to the second drive mechanism, each of the plurality of paddles extending transversely across the second separation tank;

wherein, the first and second cyclical drive systems cyclically move each paddle of the respective first and second pluralities of paddles from approximately the respective first end wall to approximately the respective second end wall and over the sludge plate to skim retentate from the surface of water in the separation tank.

18. The system of claim 17, each paddle of the first and second plurality of paddles comprising:

a rigid coupling flange adapted to couple to the cyclical drive mechanism; and, a flexible wiper coupled to and extending beyond the rigid coupling flange, wherein the flexible wiper engages along the surface of the sludge plate to push retentate off the sludge plate into the sludge collection section.

19. The system of claim 1, the sludge collection section further comprising:

a sludge collection hopper abutting the first and second separation tank second end walls; and, a sludge pump having a suction in fluid communication with the sludge collection hopper and a discharge connectable to a sludge disposal system.

20. The system of claim 1, the adjustable height clear well riser further comprising:

each clear well riser further including an open top end;

a movable weir discharge member slidingly engagable over the clear well riser top end;

a sealing member disposed between the clear well riser top end and the movable weir discharge member to seal therebetween; and, a locking member selectively engagable between the movable weir discharge member and the clear well riser top end at user-selectable heights.

* * * * *